(12) United States Patent
Montoy-Wilson et al.

(10) Patent No.: US 10,834,546 B2
(45) Date of Patent: Nov. 10, 2020

(54) SYSTEMS AND METHODS FOR PROVIDING CONTEXT-BASED USER INTERFACE

(71) Applicant: Oath Inc., New York, NY (US)

(72) Inventors: Paul Montoy-Wilson, Palo Alto, CA (US); Mark Daiss, Sunnyvale, CA (US); William Choi, San Francisco, CA (US); Prasanna Vasudevan, San Francisco, CA (US); Jeffrey Chern, Sunnyvale, CA (US); Bernat Fortet Unanue, San Francisco, CA (US)

(73) Assignee: Oath Inc., New York, NY (US)

( * ) Notice: Subject to any disclaimer, the term of this patent is extended or adjusted under 35 U.S.C. 154(b) by 50 days.

(21) Appl. No.: 14/513,079

(22) Filed: Oct. 13, 2014

(65) Prior Publication Data

US 2015/0106737 A1   Apr. 16, 2015

Related U.S. Application Data

(60) Provisional application No. 61/890,856, filed on Oct. 14, 2013, provisional application No. 61/891,363, filed on Oct. 15, 2013.

(51) Int. Cl.
*G06F 3/048* (2013.01)
*H04W 4/18* (2009.01)
(Continued)

(52) U.S. Cl.
CPC ............ *H04W 4/18* (2013.01); *G06F 3/048* (2013.01); *G06F 9/451* (2018.02); *H04M 1/72522* (2013.01); *H04M 1/72569* (2013.01)

(58) Field of Classification Search
CPC . G06F 3/048; G06F 17/30; G06F 3/00; G06F 16/00; H04W 4/00
See application file for complete search history.

(56) References Cited

U.S. PATENT DOCUMENTS 6,271,840 B1  8/2001  Finseth et al.
7,581,188 B2  8/2009  Hiles et al.
(Continued)

FOREIGN PATENT DOCUMENTS

CN   102870065 A   1/2013

OTHER PUBLICATIONS

WO patent application No. PCT/US2014/060310, International Search Report and Written Opinion dated Jan. 29, 2015.
(Continued)

*Primary Examiner* — Hugo Molina
(74) *Attorney, Agent, or Firm* — Cooper Legal Group, LLC

(57) ABSTRACT

Systems and methods for providing a context-based user interface include obtaining one or more contextual factors associated with an electronic device; predicting context information in accordance with the one or more contextual factors; and formatting a user interface on the electronic device in accordance with the predicted context information. In some implementations, formatting the user interface on the electronic device in accordance with the predicted context information includes: selecting, in accordance with the predicted context information, a first set of applications; and formatting for display to the user the first set of applications as part of a user interface of the electronic device; and formatting the user interface includes: selecting, in accordance with the predicted context information, a second set of applications; and forgoing display to the user the second set of applications as part of the user interface of the electronic device.

29 Claims, 24 Drawing Sheets

(51) Int. Cl.
*G06F 9/451* (2018.01)
*H04M 1/725* (2006.01)

(56) References Cited

U.S. PATENT DOCUMENTS

| | | | |
|---|---|---|---|
| 8,188,936 B2 | 5/2012 | Fuller et al. | |
| 8,433,800 B2 | 4/2013 | Chor | |
| 8,438,245 B2 | 5/2013 | Chor | |
| 8,745,617 B1* | 6/2014 | Stekkelpak | G06F 9/44505 717/173 |
| 8,843,477 B1 | 9/2014 | Tirumalareddy et al. | |
| 9,442,946 B1 | 9/2016 | Yuan et al. | |
| 9,678,637 B1* | 6/2017 | Brothers | G06F 3/0484 |
| 2003/0046401 A1 | 3/2003 | Abbott et al. | |
| 2006/0136832 A1 | 6/2006 | Keller et al. | |
| 2006/0184617 A1 | 8/2006 | Nicholas | |
| 2008/0146245 A1 | 6/2008 | Appaji | |
| 2008/0189360 A1 | 8/2008 | Kiley | |
| 2008/0276182 A1 | 11/2008 | Leow | |
| 2009/0061841 A1 | 3/2009 | Chaudhri et al. | |
| 2009/0265646 A1 | 10/2009 | Cho et al. | |
| 2009/0288022 A1 | 11/2009 | Almstrand et al. | |
| 2009/0322650 A1 | 12/2009 | Kakie | |
| 2010/0057770 A1* | 3/2010 | Kumashio | G06F 16/16 707/E17.01 |
| 2010/0332518 A1* | 12/2010 | Song | G06F 3/0483 707/769 |
| 2011/0126050 A1 | 5/2011 | Begole et al. | |
| 2011/0131506 A1 | 6/2011 | Calissendorff | |
| 2011/0214077 A1 | 9/2011 | Singh et al. | |
| 2011/0246918 A1* | 10/2011 | Henderson | G06F 3/04817 715/769 |
| 2012/0011511 A1 | 1/2012 | Horvitz et al. | |
| 2012/0021774 A1* | 1/2012 | Mehta | G06Q 30/0282 455/456.3 |
| 2012/0036453 A1 | 2/2012 | Appel | |
| 2012/0095979 A1* | 4/2012 | Aftab | G06F 17/30867 707/706 |
| 2012/0137235 A1 | 5/2012 | Sabarish et al. | |
| 2012/0138671 A1 | 6/2012 | Gaede | |
| 2012/0140255 A1 | 6/2012 | Tanaka | |
| 2012/0158472 A1* | 6/2012 | Singh | G06F 17/30241 705/14.4 |
| 2012/0317504 A1 | 12/2012 | Patel et al. | |
| 2012/0317638 A1* | 12/2012 | Carrara | G06F 21/44 726/17 |
| 2012/0324434 A1 | 12/2012 | Tewari et al. | |
| 2013/0014040 A1 | 1/2013 | Jagannathan et al. | |
| 2013/0024796 A1* | 1/2013 | Seo | G06F 3/04883 715/769 |
| 2013/0080890 A1 | 3/2013 | Krishnamurthi | |
| 2013/0132896 A1* | 5/2013 | Lee | G06F 16/907 715/808 |
| 2013/0166527 A1* | 6/2013 | Kasterstein | G06F 3/04817 707/706 |
| 2013/0172021 A1 | 7/2013 | Karmarkar et al. | |
| 2013/0187753 A1* | 7/2013 | Chiriyankandath | G06F 3/0488 340/5.51 |
| 2013/0275915 A1 | 10/2013 | Wang | |
| 2013/0304608 A1 | 11/2013 | Mehta et al. | |
| 2013/0305218 A1 | 11/2013 | Hirsch et al. | |
| 2013/0326499 A1* | 12/2013 | Mowatt | G06F 8/60 717/177 |
| 2013/0332518 A1 | 12/2013 | Chor | |
| 2013/0332886 A1* | 12/2013 | Cranfill | G06F 3/0482 715/835 |
| 2013/0346347 A1* | 12/2013 | Patterson | G06N 99/005 706/12 |
| 2014/0037107 A1 | 2/2014 | Marino, Jr. et al. | |
| 2014/0071036 A1 | 3/2014 | Blue | |
| 2014/0089382 A1* | 3/2014 | Wang | G06F 17/3089 709/203 |
| 2014/0101583 A1* | 4/2014 | Jeong | G06F 9/451 715/765 |
| 2014/0120961 A1* | 5/2014 | Buck | H04W 4/12 455/466 |
| 2014/0143196 A1 | 5/2014 | White et al. | |
| 2014/0146074 A1 | 5/2014 | Kwon | |
| 2014/0169641 A1 | 6/2014 | Lee et al. | |
| 2014/0188956 A1* | 7/2014 | Subba | G06F 17/30221 707/829 |
| 2014/0201655 A1* | 7/2014 | Mahaffey | G06F 3/04817 715/765 |
| 2014/0201681 A1 | 7/2014 | Mahaffey et al. | |
| 2015/0058744 A1* | 2/2015 | Dhingra | G06F 9/451 715/747 |
| 2015/0065170 A1* | 3/2015 | Brisebois | H04W 4/04 455/456.3 |
| 2015/0100552 A1 | 4/2015 | Malis et al. | |
| 2015/0248193 A1 | 9/2015 | Fujioka | |
| 2015/0296072 A1 | 10/2015 | Zhou et al. | |
| 2016/0077674 A1 | 3/2016 | Forster et al. | |
| 2016/0077808 A1 | 3/2016 | Friedman et al. | |
| 2016/0092071 A1 | 3/2016 | Lawson et al. | |
| 2016/0247110 A1 | 8/2016 | Sinha | |
| 2016/0284321 A1 | 9/2016 | Cho | |
| 2017/0090690 A1 | 3/2017 | Chor | |
| 2017/0115848 A1 | 4/2017 | Plasmeier | |
| 2017/0118201 A1 | 4/2017 | Hoyer et al. | |
| 2017/0177582 A1 | 6/2017 | Plasmeier et al. | |

OTHER PUBLICATIONS

U.S. Office Action dated Oct. 5, 2017 issued in U.S. Appl. No. 14/921,983.
CN patent application No. 201480055431.6, Office Action dated Jan. 25, 2018. ( no translation).
WO patent application No. PCT/US2014/060310, International Preliminary Report on Patentability dated Apr. 19, 2016.
EverythingMe Launcher by EverythingMe, "Get the most out of your phone," Dec. 2010, downloaded from http://everything.me/.
Yahoo! Aviate, "The intelligent homescreen that simplifies your phone," Nov. 24, 2014, downloaded from http://aviate.yahoo.com/.
Kazmucha, Allyson, "iOS 8 Tips—How to enable and disable app suggestions in iOS 8," Sep. 17, 2014, downloaded from http://www.imore.com/how-enable-and-disable-app-suggestions-ios-8.
EP patent application No. 14854058.6, Extended Search Report dated Jun. 7, 2017.
U.S. Office Action dated Dec. 14, 2017 issued in U.S. Appl. No. 14/977,390.
U.S. Final Office Action dated Jul. 6, 2018 issued in U.S. Appl. No. 14/977,390.
U.S. Final Office Action dated May 22, 2018 issued in U.S. Appl. No. 14/921,983.
U.S. Office Action dated May 15, 2018 issued in U.S. Appl. No. 14/867,755.
WO International Search Report and Written Opinion dated Mar. 27, 2017, issued in Application No. PCT/US2016/056149.
WO International Search Report and Written Opinion dated Feb. 17, 2017, issued in Application No. PCT/US2016/066411.
WO International Preliminary Report on Patentability dated Jun. 26, 2018, issued in Application No. PCT/US2016/066411.
U.S. Appl. No. 13/966,118, Notice of Allowance dated Feb. 16, 2016.
Amazon, "Getting started with the Alexa Skills Kit," downloaded from https://developer.amazon.com/public/solutions/alexa/alexa-skills-kit/getting-started-guide, © Amazon.com, Inc. 2010-2014.
Wikipedia, "Amazon Echo," downloaded from https://en.wikipedia.org/wiki/Amazon_Echo, last modified Apr. 9, 2016.
Wilbert O. Galitz, The Essential Guide to User Interface Design: An Introduction to GUI Design Principles and Techniques, 3rd Edition, Apr. 16, 2007, John Wiley & Sons, All pages. (Year: 2007).
U.S. Office Action dated Nov. 16, 2018 issued in U.S. Appl. No. 14/921,983.
U.S. Final Office Action dated Jan. 11, 2019 issued in U.S. Appl. No. 14/867,755.

(56) References Cited

OTHER PUBLICATIONS

WO International Preliminary Report on Patentability dated Apr. 24, 2018, issued in Application No. PCT/US2016/056149.
CN Office Action dated Oct. 15, 2018, issued in Application No. 201480055431.6.

* cited by examiner

View #1

View #2

Home Screen #2

Home Screen #1

SYSTEMS AND METHODS FOR PROVIDING CONTEXT-BASED USER INTERFACE

RELATED APPLICATIONS

This application claims priority from U.S. Provisional Application No. 61/890,856, entitled "System and Method for Providing Context-Based User Interface," by Montoy-Wilson et al, filed on Oct. 14, 2013, which is incorporated herein in its entirety and for all purposes.

This application also claims priority from U.S. Provisional Application No. 61/891,363, entitled "System and Method for Providing Context-Based User Interface," by Montoy-Wilson et al, filed on Oct. 15, 2013, which is incorporated herein in its entirety and for all purposes.

TECHNICAL FIELD

The implementations disclosed herein relate generally to providing a context-based user interface.

BACKGROUND

Conventional user interfaces are static—e.g., not customized based on context information relating to a user. For example, many smart phones have a grid of applications and/or widgets that are constant throughout the day. For another example, conventional user interfaces on mobile phones do not change based on whether a user is at home or at work.

The static nature of conventional user interfaces might inconvenience a user. For example, when at home, a user may want to maintain on his/her smartphone home page a deal-seeking/shopping application (which provides minute-by-minute updates on discounted online merchandise). On the other hand, while at work, the user might want to have the deal-seeking/shopping application displayed at a much less conspicuous location on the smartphone, but instead have a MICROSOFT OUTLOOK application displayed on the homepage. Typically, a user might need to manually change the smartphone user interface for different settings, which is both inconvenient and time-consuming.

What is needed therefore is a context-based user interface that effortlessly organizes a user's phone and anticipates information and applications as needed.

The above identified technical problems are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

SUMMARY

Figure 1:
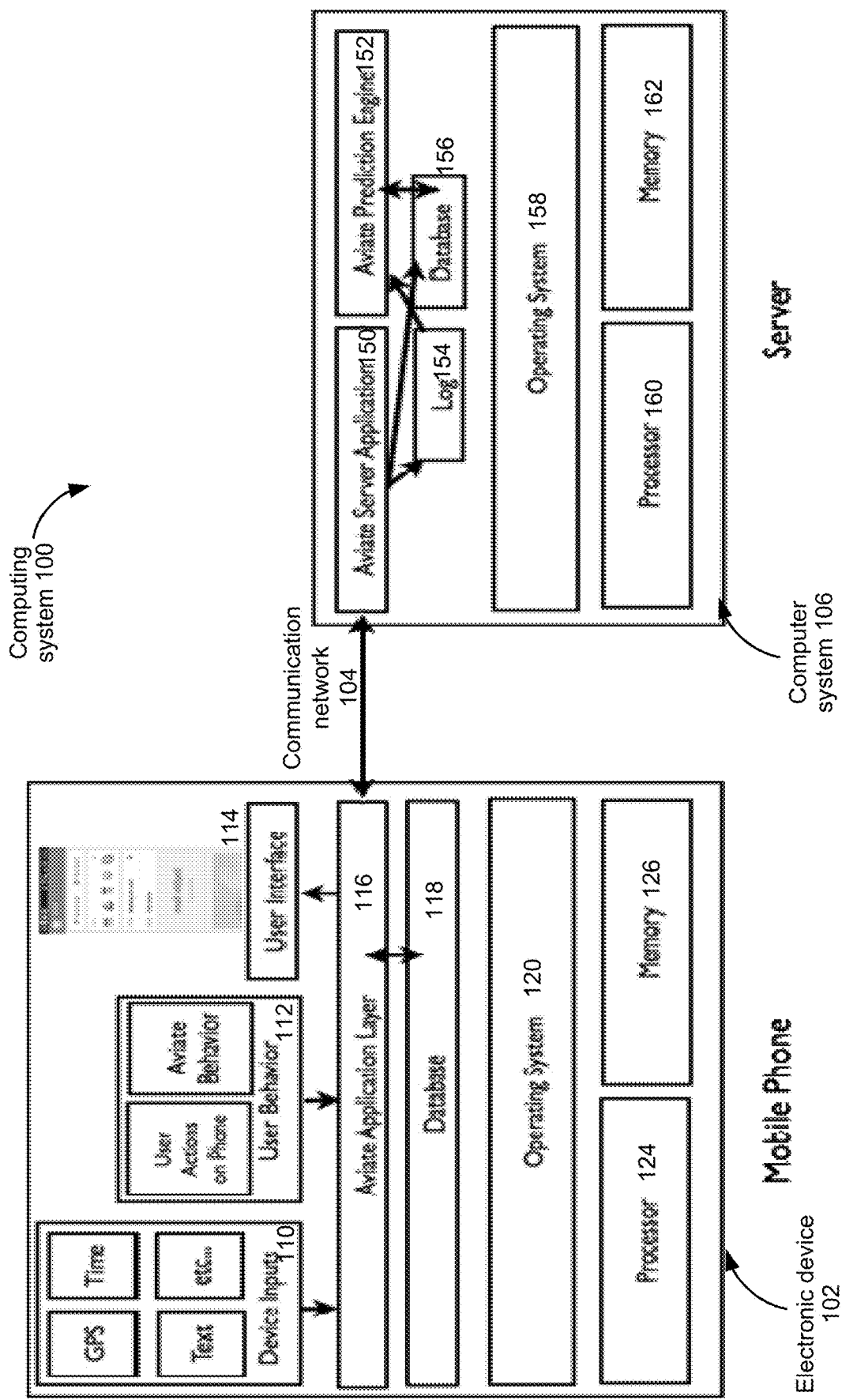
FIG. 1 is an example block diagram illustrating a computing system, in accordance with some implementations.

Technical solutions (e.g., computing systems, methods, and non-transitory computer readable storage mediums) for clustering electronic messages are provided in the present application.

In some implementations, a method includes, at a computing device having one or more processors and memory storing one or more programs for execution by the one or more processors: obtaining one or more contextual factors associated with an electronic device; predicting context information in accordance with the one or more contextual factors; and formatting a user interface on the electronic device in accordance with the predicted context information.

In some implementations, the electronic device is the computing device.

In some implementations, the electronic device is distinct from the computing device.

In some implementations, formatting the user interface on the electronic device in accordance with the predicted context information includes: selecting, in accordance with the predicted context information, a first set of applications from a plurality of applications; and formatting for display to the user the first set of applications as part of a user interface of the electronic device.

In some implementations, formatting the user interface on the electronic device in accordance with the predicted context information includes: selecting, in accordance with the predicted context information, a second set of applications from a plurality of applications; and forgoing display to the user the second set of applications as part of the user interface of the electronic device.

In some implementations, forgoing display to the user the second set of applications as part of the user interface of the electronic device includes: hiding from display to the user the second set of applications as part of the user interface of the electronic device.

In some implementations, the one or more contextual factors include at least one of: an environment factor, a speed factor, a weather factor, an altitude factor, a location factor, a device factor, a time factor, or a user profile.

In some implementations, the location factors include at least one of: a recent location of the electronic device; a past location of the electronic device; a current location of the electronic device; or a distance between the current location and a past location of the electronic device.

In some implementations, the device factors include at least one of: a network connection status of the electronic device; a signal reception status of the electronic device; a plurality of messages sent from or delivered to the electronic device; a history of application executed on the electronic device; a history of user interactions with the user interface of the electronic device; a history of user interactions with applications displayed on the user interface of the electronic device; an audio cable connection of the electronic device; a charging cable connection of the electronic device; or a history of user notifications displayed on the electronic device.

In some implementations, the time factors include at least one of: a time of day associated with the electronic device; a day of week associated with the electronic device; a day of month associated with the electronic device; a month associated with the electronic device; or a season associated with the electronic device;

In some implementations, the weather factors include at least one of: a temperature associated with the electronic device; a rain factor associated with the electronic device; a snow factor associated with the electronic device; or a wind factor associated with the electronic device.

In some implementations, a method comprises: at a computing device having one or more processors and memory storing one or more programs for execution by the one or more processors: identifying contextual information associated with a user; and in accordance with the contextual information, updating, within a user interface, a smart folder that includes a first set of shortcuts to a first set of user applications. In some implementations, this is done by generating a second set of shortcuts by modifying the first set of shortcuts; and formatting for display to the user the second set of shortcuts.

In some implementations, a method comprises: at a computing device having one or more processors and memory storing one or more programs for execution by the one or more processors: formatting for display a first view; causing the first view to be displayed to a user; formatting for display a second view without displaying the second view to the user; causing the second view to be hidden from the user; responsive to a predefined user action with respect to the first view, causing the second view to be displayed to the user, without hiding the first view.

In other aspects of the present disclosure, computing systems and non-transitory computer storage mediums for executing one or more steps of the above-described methods are also disclosed.

DETAILED DESCRIPTION

The implementations described herein provide various technical solutions to improve human computer interactions, and in particular to the above-identified problems—by providing a context-based user interface on electronic devices.

Additional details of implementations are now described in relation to the Figures.

FIG. 1 is a block diagram illustrating a computing system 100, in accordance with some implementations. In some implementations, the computing system 100 includes one or more electronic devices 102 (e.g., electronic device 102A, 102B, 102C, 102D . . . , and 102N), a communication network 104, and a computer system 106. In some implementations, an electronic device 102 is a phone (mobile or landline, smart phone or otherwise), a tablet, a computer (mobile or otherwise), a fax machine, or an audio/video recorder.

In some implementations, an electronic device 102 obtains one or more contextual factors associated with an electronic device 102, and formats a user interface based on context information predicted (e.g., by a computer system 102) based on the contextual factors.

In some implementations, the electronic device 102 may include a device input module 110, a user behavior detection module 112, a user interface module 114, an application layer 118, a database 118, an operating system 120, a processor 124, and a memory 126.

In some implementations, the device input module 110 may include a location detection module (e.g., a GPS), a time detection module (e.g., a clock), and a message detection module (e.g., a text message or email application).

In some implementations, the user behavior detection module 112 may detect user behaviors with respect to the electronic device 102, to applications resident, executed, and/or stored thereon, to data resident and/or stored thereon, and to a user interface displayed or being displayed on the electronic device 102.

In some implementations, the user interface module 114 may provide (e.g., prepares or formats for display) a user interface on the electronic device 102.

In some implementations, the application layer 118 provides an interface for applications on the electronic device 102 to communicate with the database 118.

In some implementations, the database 118 includes history data, such as a history of user behaviors with respect to the electronic device 102, to applications resident, executed, and/or stored thereon, to data resident and/or stored thereon, and to a user interface displayed or being displayed on the electronic device 102.

In some implementations, the operating system 120 includes procedures for handling various basic system services and for performing hardware dependent tasks. In some implementations, the processor 124 includes one or more processing units CPU(s). In some implementations, the memory 126 may include high-speed random access memory, such as DRAM, SRAM, DDR RAM or other random access solid state memory devices. The memory 126 may further include non-volatile memory, such as one or more magnetic disk storage devices, optical disk storage devices, flash memory devices, or other non-volatile solid state storage devices. The memory 126 may also optionally include one or more storage devices remotely located from the CPU(s) 202. The memory 126 or alternatively the non-volatile memory device(s) within the memory 126, may include a non-transitory computer readable storage medium. In some implementations, the memory 126 or alternatively the non-transitory computer readable storage medium, may store the programs, modules and data structures set forth below.

In some implementations, the communication network 104 interconnects one or more electronic devices 102 with each other, and with the computer system 106. In some implementations, the communication network 104 optionally includes the Internet, one or more local area networks (LANs), one or more wide area networks (WANs), other types of networks, or a combination of such networks.

In some implementations, the computer system 106 obtains contextual factors associated with an electronic device 102, predicts context information based thereon, and prepares a list of applications to be displayed on the electronic device 102. In some implementations, after predicting the context information, the computer system 106 transmits context information to the electronic device 102, which then selects a list of applications for display thereon. For example, based on the location (e.g., GPS data) of a smart phone, a server may determine that a user (or at least the smart phone) is at work, rather than at home, and as such displays a MICROSOFT OUTLOOK application on the Smartphone's home page, and hides a deal-seeking/shopping application from the Smartphone's home page.

In some implementations, the computer system 106 includes a server application 150, a prediction engine 152, a log 154, a database 156, an operating system 158, a processor 160, and a memory 162.

In some implementations, the server application 150 processes contextual factors received from the electronic device 102, e.g., determining a user's location based on a GPS location received from a cell phone known to belong to the user.

In some implementations, the prediction engine 152, based on processing results generated by the server application 150, predicts a set of applications to be displayed on a user interface of the electronic device 102. For example, based on a determination by the server application 150 that a user is at a bus/train/ferry stop, the prediction engine 152 may select an application that shows scheduling information for public transportation options (e.g., a train/bus/ferry schedule.

In some implementations, the log 154 records history data, such as a set of applications recently displayed on a user interface of the electronic device 102, past user interactions with an application displayed on the user interface, or with the user interface itself, and a list of applications that have not been displayed (e.g., hidden from display) on the user interface.

In some implementations, the database 156 includes history data, such as a history of user behaviors with respect to the electronic device 102, to applications resident, executed, and/or stored thereon, to data resident and/or stored thereon, and to a user interface displayed or being displayed on the electronic device 102.

In some implementations, the operating system 158 includes procedures for handling various basic system services and for performing hardware dependent tasks. In some implementations, the processor 160 includes one or more processing units CPU(s). In some implementations, the memory 162 may include high-speed random access memory, such as DRAM, SRAM, DDR RAM or other random access solid state memory devices. The memory 162 may further include non-volatile memory, such as one or more magnetic disk storage devices, optical disk storage devices, flash memory devices, or other non-volatile solid state storage devices. The memory 162 may also include one or more storage devices remotely located from the CPU(s) 202. The memory 162 or alternatively the non-volatile memory device(s) within the memory 162, may include a non-transitory computer readable storage medium. In some implementations, the memory 162 or alternatively the non-transitory computer readable storage medium stores the programs, modules and data structures set forth below.

Figure 2:
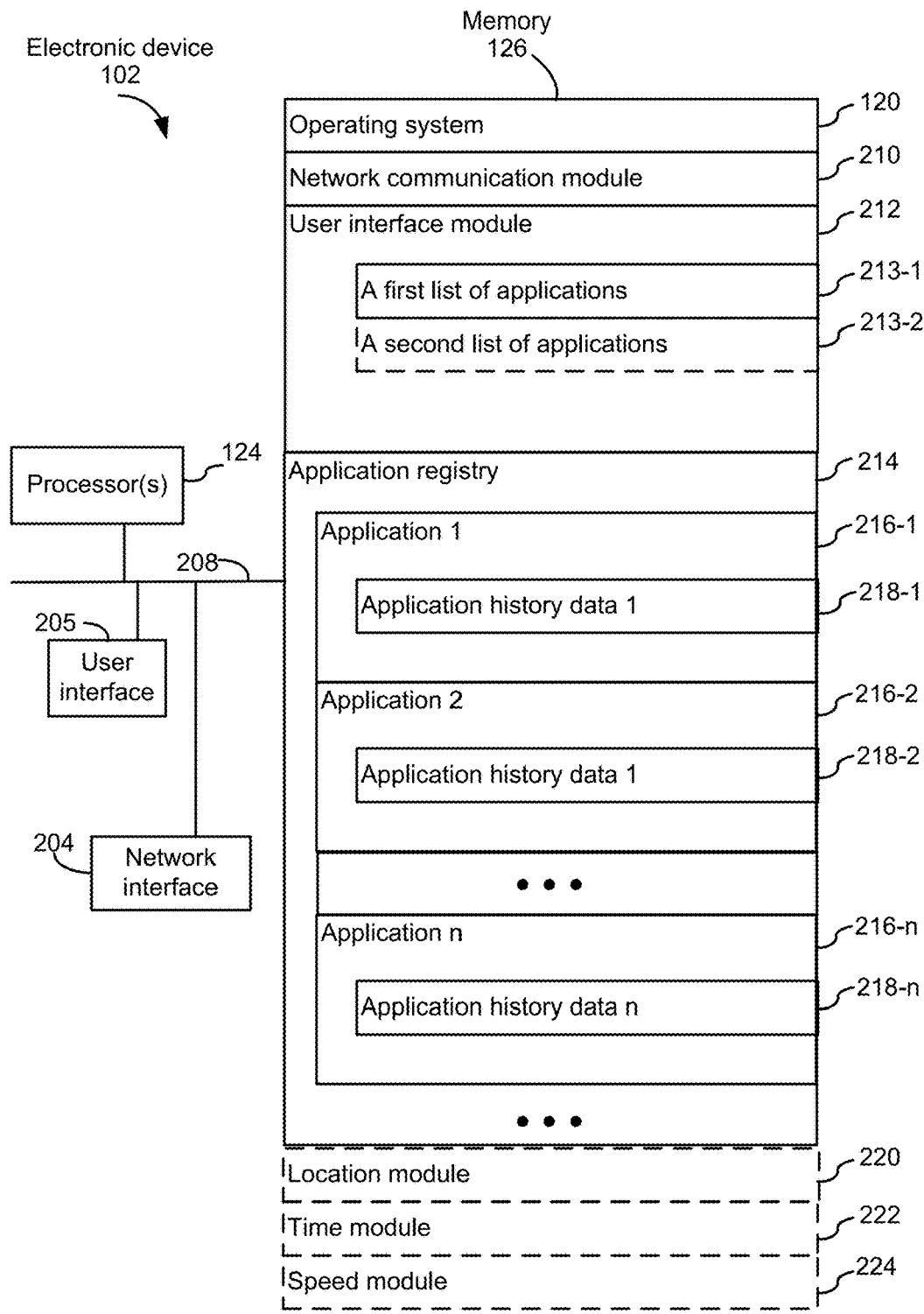
FIG. 2 is an example block diagram illustrating an electronic device, in accordance with some implementations.

FIG. 2 is a block diagram illustrating an electronic device 102, in accordance with some implementations. The electronic device 102 in some implementations includes one or more processing units CPU(s) (also referred to as processors) 124, one or more network interfaces 204, a user interface 205, a memory 126, and one or more communication buses 208 for interconnecting these components. The communication buses 208 optionally include circuitry (sometimes called a chipset) that interconnects and controls communications between system components. The memory 126 typically includes high-speed random access memory, such as DRAM, SRAM, DDR RAM or other random access solid state memory devices. The memory 126 may optionally include non-volatile memory, such as one or more magnetic disk storage devices, optical disk storage devices, flash memory devices, or other non-volatile solid state storage devices. The memory 126 may further include one or more storage devices remotely located from the CPU(s) 124. The memory 126, or alternatively the non-volatile memory device(s) within the memory 206, may include comprise a non-transitory computer readable storage medium. In some implementations, the memory 126 or alternatively the non-transitory computer readable storage medium stores the following programs, modules and data structures, or a subset thereof:

- an operating system 120, which includes procedures for handling various basic system services and for performing hardware dependent tasks;
- a network communication module (or instructions) 210 for connecting the electronic device 102 with other devices (e.g., the computer system 106 and other electronic devices 102B . . . 102N) via one or more network interfaces 204 (wired or wireless), or the communication network 104 (FIG. 1);
- a user interface module 214 for displaying user interface components or controls (e.g., textbox, button, radio button, drop-down list) to a user, which includes
  - a first list of applications (213-1) to be displayed (e.g., made visible) on a user interface of the electronic device 102. For example, a bus/train schedule application may be displayed when a user is determined to have stopped at or been walking towards a bus stop or a train station; and
  - optionally, a second list of applications (213-2) to be hidden from display (e.g., made invisible) on a user interface of the electronic device 102. For example, a chat application may be hidden from display when a user is determined to be attending a professional conference. As another example, a personal-dating application (e.g., a MATCH.COM application) may be removed from a homescreen of a smartphone when a user is determined to be at work.
- an application registry for recording and maintaining application history data 218-$i$ with respect to one or more applications 216-$i$. More particularly, the application registry may include, for each of the applications:
  - an application identifier, which may identify an application such as a calendar application, an email application, a chat application, a personal-dating application, a video-conference application, a navigation application, or a direction application; and
  - application history data 218-$i$ for the application identifier. The application history data 218-$i$ may include history data, such as how many times the application 216-$i$ has been executed on a smartphone, seen but ignored by a user, or hidden from display to a user;
- optionally a location module 220 for identifying a location (or an approximation thereof), e.g., using GPS data, of the electronic device 102, which can be used to determine (or approximate) a location of a user of the electronic device 102, e.g., when it is assumed that the user is within a predefined vicinity of the electronic device 102—e.g., when the user is carrying the electronic device 102 on his/her person, or in his/her car;

optionally a time module 222 for identifying a time (or an approximation thereof) associated with the electronic device 102, e.g., the current time of day (e.g., 3 AM or 4 PM), the current day of week (e.g., Friday or Monday), the current day of month (e.g., the 21st, or the 30th); and optionally a speed module 222, e.g., a portable speedometer, for identifying a speed (or an approximation thereof) of the electronic device 102, which can be used to determine (or approximate) a speed of a user of the electronic device 102, e.g., when it is assumed that the user is carrying the electronic device 102 on his/her person, or in his/her car. For example, when it is determined that the electronic device 102 is travelling at a speed of 2 miles per hours, it may be determined/assumed that a user of the electronic device 102 is running/jogging (and therefore a personal fitness application or a jogging map application may be appropriate). As another example, when it is determined that the electronic device 102 is travelling at a speed of 60 miles per hour, it may be determined/assumed that a user of the electronic device 102 is driving a vehicle/riding a train (and therefore a traffic condition application or a train schedule application may be appropriate).

In some implementations, the user interface 205 includes an input device (e.g., a keyboard, a mouse, a touchpad, a track pad, and a touch screen) for a user to interact with the electronic device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 126 optionally stores a subset of the modules and data structures identified above. Furthermore, the memory 126 may store additional modules and data structures not described above.

Figure 3:
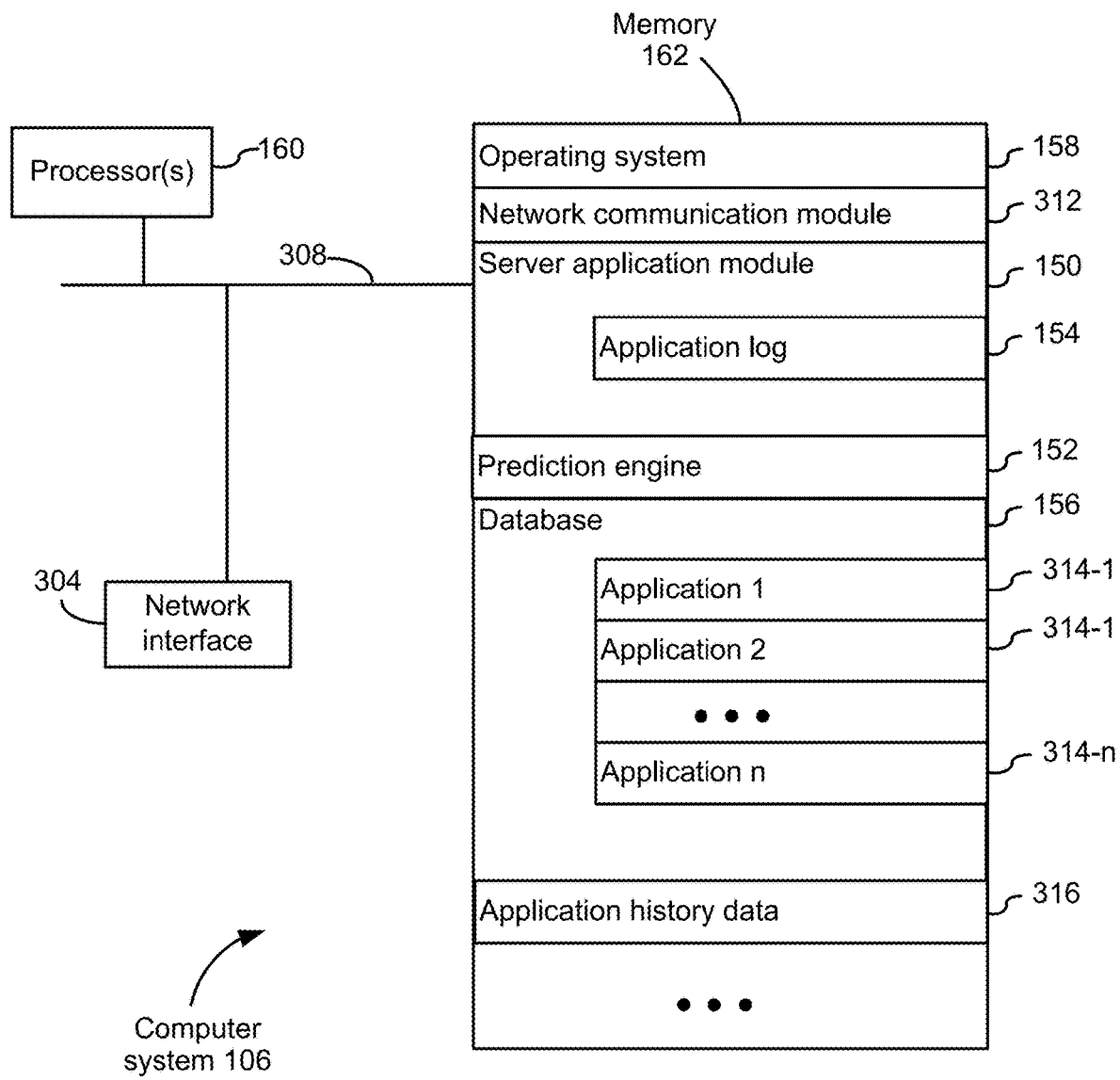
FIG. 3 is an example block diagram illustrating a computer system, in accordance with some implementations.

FIG. 3 is a block diagram illustrating a computer system 106, in accordance with some implementations. The computer system 106 in some implementations includes one or more processing units CPU(s) (also referred to as processors) 160, one or more network interfaces 304, a memory 162, and one or more communication buses 308 for interconnecting these components. The communication buses 308 optionally include circuitry (sometimes called a chipset) that interconnects and controls communications between system components. The memory 162 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 162 may include one or more storage devices remotely located from the CPU(s) or processors 160. The memory 162, or alternatively the non-volatile memory device(s) within the memory 162, may include a non-transitory computer readable storage medium. In some implementations, the memory 162, or alternatively the non-transitory computer readable storage medium stores the following programs, modules and data structures, or a subset thereof:

an operating system 158, which includes procedures for handling various basic system services and for performing hardware dependent tasks;

a network communication module (or instructions) 312 for connecting the computer system 106 with other devices (e.g., an electronic device 102 and other computer system 106) via one or more network interfaces 304 (wired or wireless), or the communication network 104 (FIG. 1);

a server application module 312 for maintaining one or more applications on the computer system 106, e.g., for download to or execution on the electronic device 102, which includes:

an application log 154 for logging application history data 316 on the computer system 106;

a database 156 for storing one or more applications 314-*i* for download to the electronic device 102; and application history data 316; e.g., how frequent a calendar application is displayed on a user interface of an electronic device; how recent an email application is hidden from display on the user interface of the electronic device 102; how soon a chat application is executed once it is displayed on the user interface of the electronic device 102; and how often a personal-dating application moved from one (e.g., conspicuous) location (e.g., the homepage) to another (e.g., inconspicuous) location, on the user interface of the electronic device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 162 optionally stores a subset of the modules and data structures identified above. Furthermore, the memory 162 may store additional modules and data structures not described above.

Although FIGS. 2 and 3 show an "electronic device 102" and a "computer system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
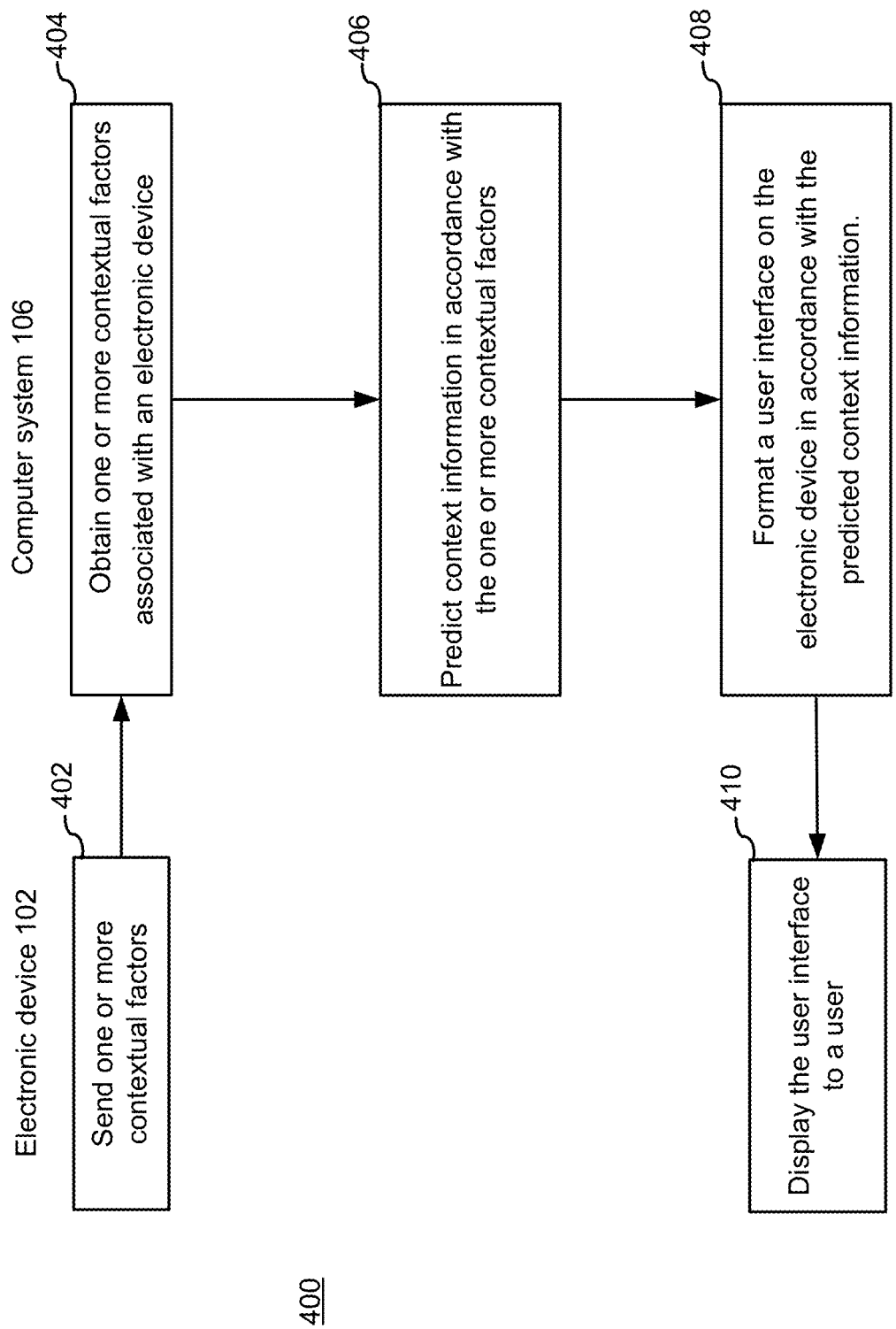
FIG. 4 is an example flow chart illustrating a method for providing a context-based user interface in a computing system, in accordance with some implementations.

FIG. 4 is an example flow chart illustrating a method 400 for providing a context-based user interface, in accordance with some implementations. In some implementations, an electronic device 102 sends (402), to the computer system 106, one or more contextual factors regarding the electronic device 102, e.g., a speed at which the electronic device 102 (and thus a user thereof) is travelling (e.g., 6 mph which is suggestive of running or sprinting, or 75 mph which is suggestive of driving), and a location of the electronic device 102 (e.g., at a restaurant, at a national park, at a train station, at a bus stop, at a library, at a coffee shop, at a bookstore, in the state of California or Alaska, in the country of China or U.S.).

In some implementations, after obtaining (404) the one or more contextual factors from the electronic device 102, the computer system 106 predicts (406) context information in accordance with the one or more contextual factors, e.g., a user of the electronic device 102 is walking, running, jogging, sprinting, swimming (e.g., using a speed factor and a pressure factor), or hiking (e.g., using a speed factor and an altitude factor).

In some implementations, the computer system 106 formats (408) a user interface on the electronic device 102 in accordance with the predicted context information. For example, when a user is determined to be driving, the computer system 106 may cause a driving direction application to be displayed on a user interface of the user's smartphone. As another example, when a user is determined to be hiking, the computer system 106 may cause a trail map to be displayed on a user interface of the user's smartphone. As yet another example, when a user is determined to be at work, the computer system 106 may cause a personal-dating or deal-seeking/shopping application to be removed from the homepage of the user's smartphone. As yet another example, when a user is determined to be at home, the computer system 106 may cause a TV remote control application to be executed on the user's smartphone, so that the user can remotely control his/her TV. As yet another example, when it is determined that it is early morning, computer system 106 may cause a news application (e.g., a CNN or FOX NEWS application) to be displayed on the user's smartphone.

In some implementations, in accordance with the user interface formatted by the computer system 106, the electronic device 102 displays (410) the user interface to a user via a display of the electronic device 102 or a display coupled to the electronic device 102.

In some implementations, a next generation contextual-based homescreen called Aviate is disclosed. In some implementations, the contextual-based homescreen effortlessly organizes a user's phone and anticipates information and applications the user needs.

In some implementations, the context-based homescreen includes a dynamic home screen, which uses tracking information and algorithms to display the right information at the right time. In some implementations, the contextual-based homescreen includes smart folders, which keep a phone continuously organized and up to date with the latest applications. In some implementations, other techniques for providing the context-based homescreen are provided.

Figure 5:
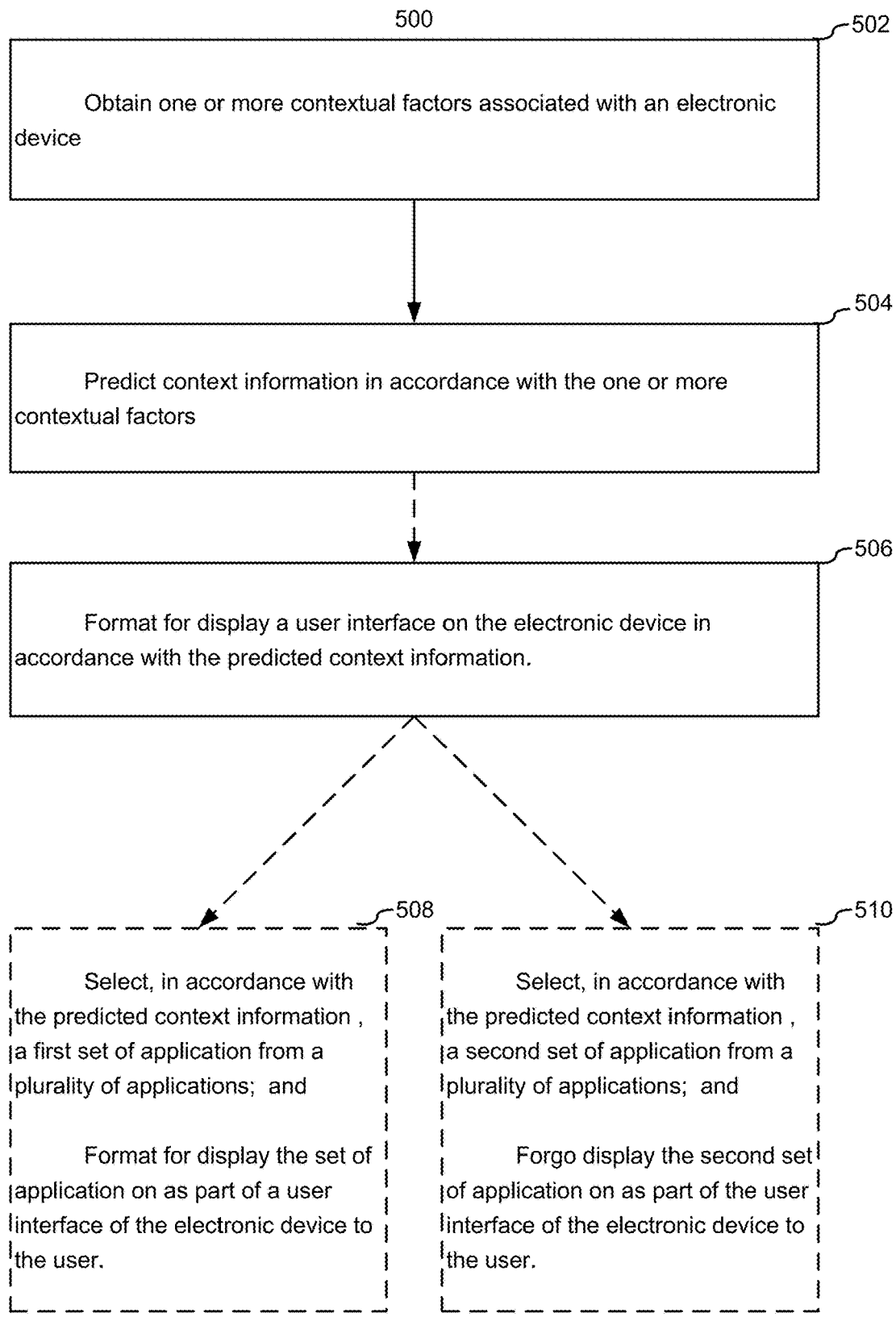
FIG. 5 is an example flow chart illustrating a method 500 for clustering electronic messages, in accordance with some implementations.

FIG. 5 is an example flow chart illustrating a method 500 for clustering electronic messages, in accordance with some implementations. One or more contextual factors associated with an electronic device may be obtained at 502. Context information may be predicted in accordance with the one or more contextual factors at 504. A user interface may be formatted for display on the electronic device in accordance with the predicted context information at 506.

At 508, a first set of applications may be selected from a plurality of applications in accordance with the predicted context information. The first set of applications may be formatted for display to a user as part of a user interface of the electronic device.

At 510, a second set of applications may be selected from a plurality of applications in accordance with the predicted context information. It may be desirable to forgo display to the user the second set of applications as part of the user interface of the electronic device.

Figure 6:
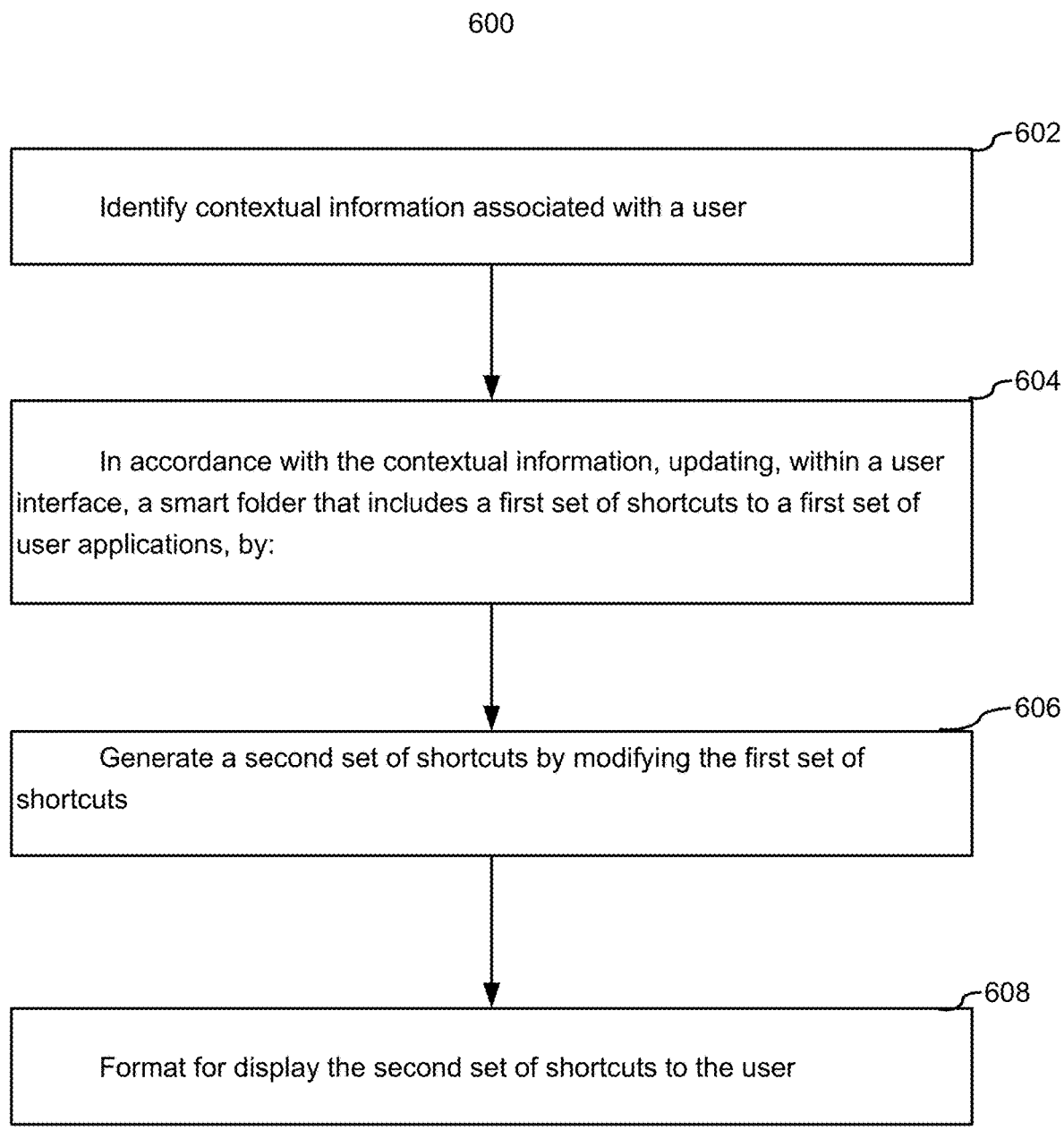
FIG. 6 is an example flow chart illustrating a method 600 for clustering electronic messages, in accordance with some implementations.

FIG. 6 is an example flow chart illustrating a method 600 for clustering electronic messages, in accordance with some implementations. Contextual information associated with a user may be identified at 602. In accordance with the contextual information, a smart folder within a user interface may be updated at 604, where the smart folder includes a first set of shortcuts to a first set of user applications. The smart folder may be updated by modifying the first set of shortcuts such that a second set of shortcuts is generated at 606. The second set of shortcuts may be formatted for display to the user at 608.

Dynamic Home Screen

Conventionally, home screens for electronic devices are static. Smartphones have a grid of applications and/or widgets that are constant throughout the day. The present application describes various implementations of user interfaces in which, based on a user's context (e.g., time, user location or activities, season, weather, calendar events, day of week, user interest profile, etc.), the home screen displays/surfaces the most relevant content (e.g. applications, actions, widgets, information, alerts, feeds, etc.). In this way, a user is provided with home screen information and links that are most appropriate for the user based on his or her current context.

In some implementations, a context-based user interface takes into account the different paradigms (e.g., push and pull) under which applications operate and exchange information with users, client devices, and servers. Under the push paradigm, applications send information through a push notification and interrupt users to notify them that pushed information is available in the application. Under the pull paradigm, a user is required to open an application to receive information. The dynamic home screen opens up an opportunity to surface relevant information and actions to the user right when they need them without interrupting their flow. Note that although this section is called dynamic home screen, the contextual engine that is detailed below does not require the client be a homescreen (it could also be a traditional application).

In some implementations, the information that a client can send to the server contains, but is not limited to: recent locations (latitude/longitude), recent Wi-Fi connects/disconnects or signal changes, recent text messages, recent application openings or executions, recent actions taken within a user interface, interaction with context header, interaction with the context-based user interface, e.g., information and shortcuts displayed therein, user interaction with Smart Folders, interaction with application recommendations, audio cable plugged in or out, charger plugged in or out, recent Bluetooth turned on/off or connected/disconnected, and recent notifications.

In some implementations, the information that a client can send to the server contains, but is not limited to, external factors. For example, time factors may include at least one of: time of day (00:00-24:00), day of week (Sun-Sat), day of month (1-31), month (1-12), or season (0-1). For example, weather factors may include at least one of: temperature, likelihood and/or amount of rain, or likelihood and/or amount of snow. For example, travel factors may include at least one of: presence of traffic, amount of traffic, or estimated time between current location and predicted destination. For example, event factors may include at least one of: a user's appointment, past or future, recorded on the client device, or downloaded to the client device.

In some implementations, the content that the server can send to the client includes, but is not limited to: directions (driving/walking directions to home when a user is not at home and indicates that he/she would like to go home); reminders (e.g., to take keys/wallet/phone when a user is about to leave home). In some implementations, the content that the server can send to the client includes application recommendations. Example application recommendations include (i) a driving navigation application when a user is at a high speed, and is thus likely driving; (ii) a public transit application, e.g., CaltrainDroid, BART, Next Muni, when a user is traveling and stopping at known public transit stops and thus is likely traveling by public transportation; (iii) a sports application, e.g., NBA Gametime, when a user discusses an NBA or NFL game and there is an on-going game; (iv) a music application (e.g., Spotify, Pandora) when a user wants to listen to music (e.g., when an audio cable is plugged in); and (v) recently opened applications.

In some implementations, the content that the server can send to the client includes information relating to other users, e.g., a LinkedIn Profile, and a number of persons a user is meeting or is about to meet.

In some implementations, the content that the server can send to the client includes weather information, e.g., displaying weather information when a user wants it (e.g., every morning, when it's raining, etc.).

In some implementations, the content that the server can send to the client includes actions, e.g., displaying an alarm clock application when a user is in bed; displaying a "Call Mom" option on Mother's Day; displaying a power saving mode when the battery is low.

In some implementations, a user created platform and a developer platform for context-based user interface are provided. In some implementations, users and developers can plug into a platform to surface/display relevant information to themselves/to others when it is useful.

In some implementations, a context-based user interface automatically changes the homescreen, immediately connecting someone to information based on their context without requiring user intervention/action.

In some implementations, when a user walks into a restaurant, the context-based user interface automatically changes the homescreen to show information that would be useful to the user including, but not limited to, photos, tips, recommendations, ratings, and/or applications that are useful in a restaurant setting.

In some implementations, when a user wakes up in the morning and pulls up their phone, information that is used in the morning may be automatically displayed on the homescreen. This information may include, but is not limited to, weather, meetings for the day, news headlines, and/or applications that are used frequently by that person in the morning.

In some implementations, when a user is driving in the car or riding on the train (or any other mode of transportation), Aviate automatically modifies the homescreen to provide useful information on the homescreen. This information may include, but is not limited to, directions to the user's home, directions to the user's work, information pertaining to the surroundings, information pertaining to traffic or cheap gas nearby, and/or identification of applications that are useful while moving in a car, train, or other mode of transportation.

In some implementations, when an electronic device logs all the relevant information (see above for types of information), this information may affect both its current state (what the electronic device is doing right now) and its static state (properties about the electronic device such as work and home location). Both the current and the static state may feed into the predictor, which then sends the current context back to the electronic device.

Figure 7A:
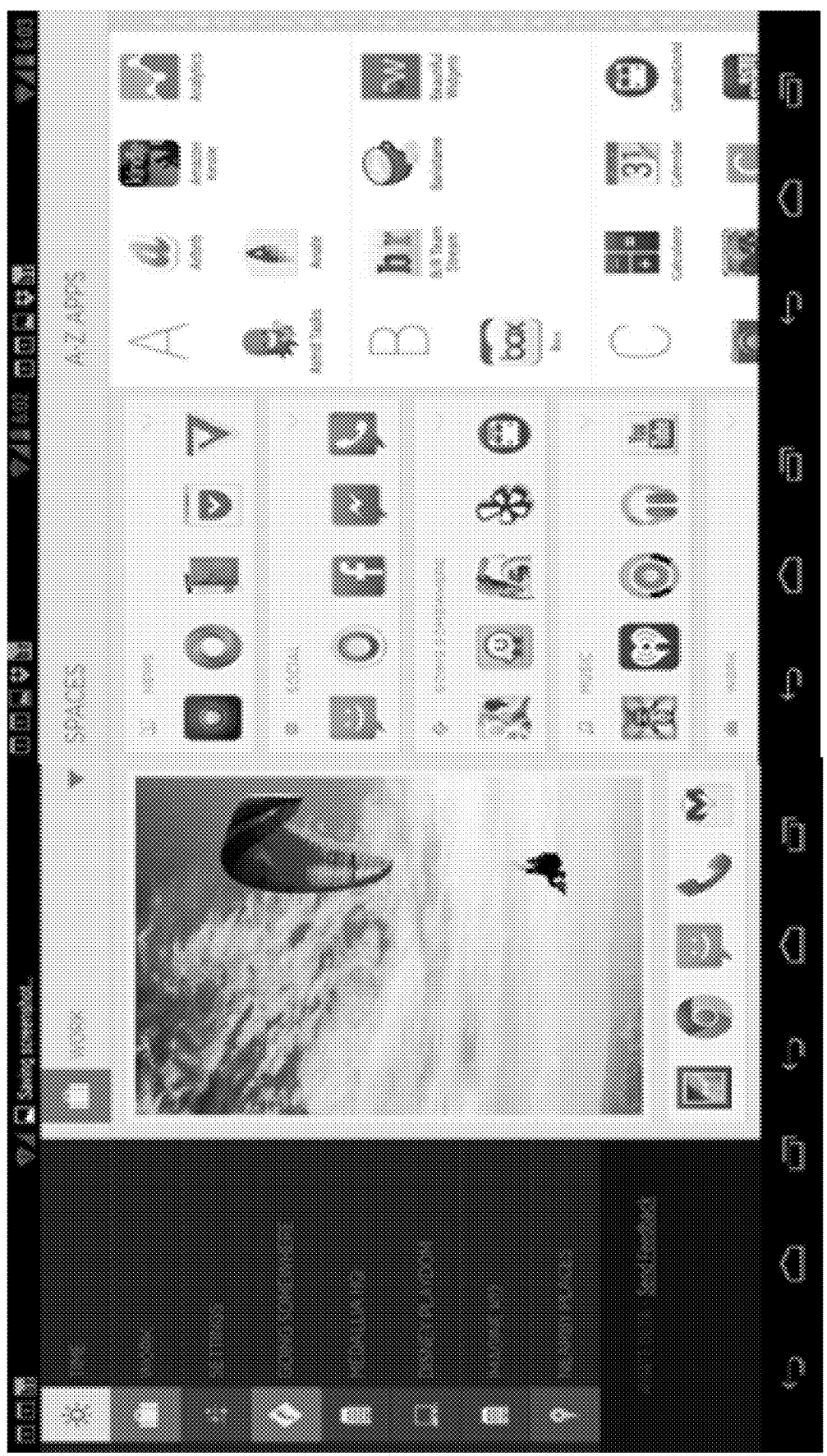
FIG. 7A is an example diagram illustrating a method for clustering electronic messages, in accordance with some implementations.

In some implementations, as shown in FIG. 7A, the left hand screen corresponds to all of the contexts that currently can be triggered. The second to the left hand screen corresponds to the currently triggered context (Work). The second to the right hand screen contain the smart folders (see below). The right hand screen is the A-Z Application list of the applications.

Figure 7B:
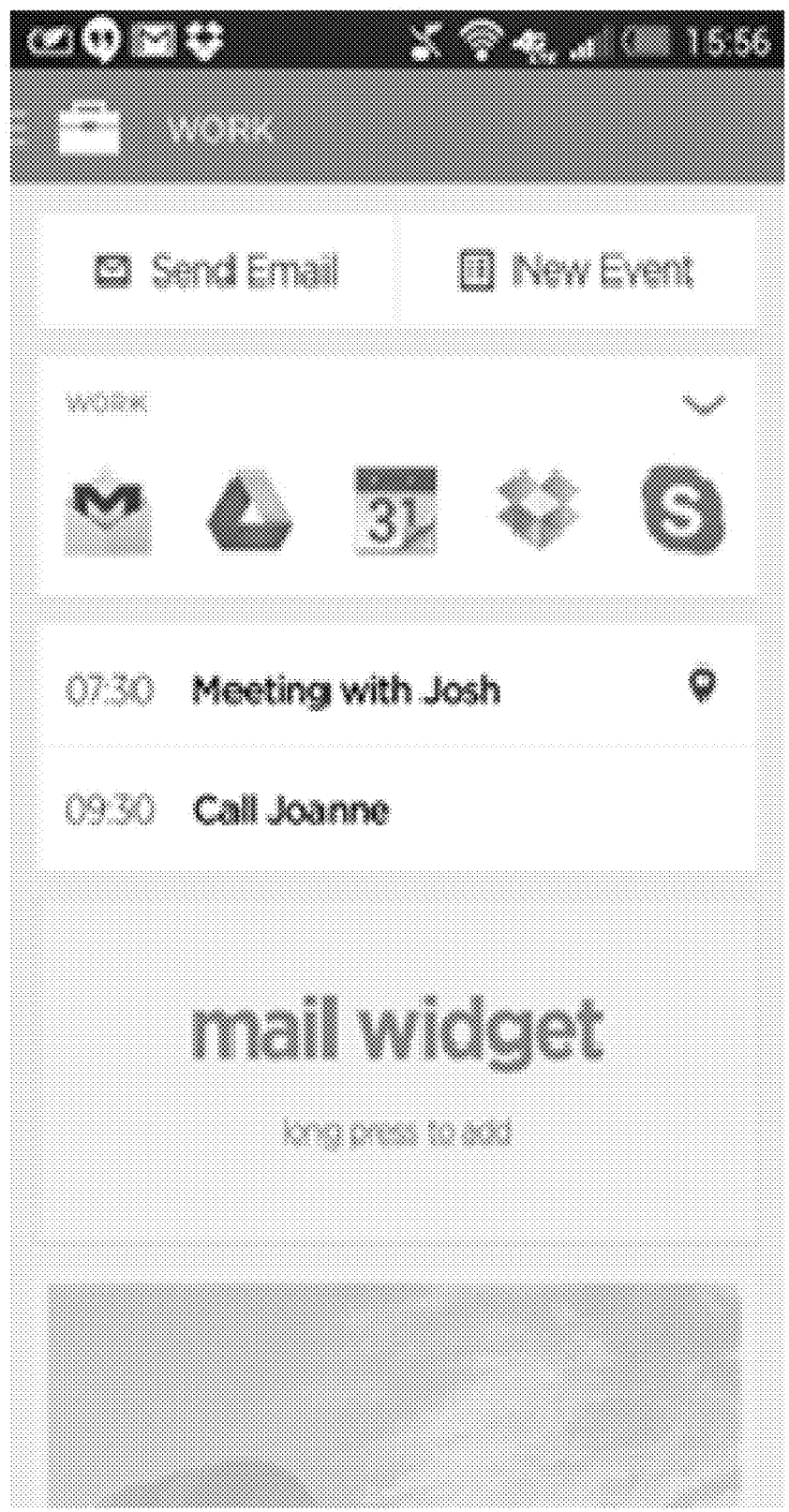
FIG. 7B is an example diagram illustrating a method for clustering electronic messages, in accordance with some implementations.

In some implementations, as shown in FIG. 7B, a work space on the second to the left hand screen, corresponding to the currently triggered context, is expanded. In this example, the content that is currently being recommended includes the calendar identifying the next meeting and the work applications.

Smart Folders

Folders today on phones are static. Users have to create them and maintain them. Smart Folders take away this burden by auto-creating the most relevant folders, keeping them organized, and introducing users to new applications.

In some implementations, based on the users contextual information, a server recommends the top smart folders that are relevant to the user. In some implementations, a user is enabled to add and remove smart folders that are currently visible. In some implementations, a smart folder automatically includes all of the applications on the device that are relevant to it. In some implementations, a user may receive recommended new applications via the smart folder. In some implementations, when a new application is installed, if it is relevant to the smart folder, it may be automatically added to the smart folder. In some implementations, a user can share/follow other users' folders.

In some implementations, example functionalities of a smart folder are disclosed. In some implementations, a smart folder evolves, e.g., gets updated, throughout a user's interaction with the user interface, in which the smart folder is displayed.

Use Case—Smart Folder Selection:

In some implementations, a method for selecting a smart folder is disclosed. In some implementations, when a user initially installs the smart folder application system, the smart folder application system indexes all the applications on the device. Based on several signals, Aviate may display the Smart Folders most likely to be used by the user on the homescreen. When the user first sees the Aviate homescreen, the user now immediately has access to applications that they are most likely to use most at his fingertips. The user then can add Smart Folders to/remove Smart Folders from the homescreen. For example, if the Games Smart folder was selected, but the user never plays games and instead takes many photos with their phone, the user could hide the Game smart folder, and instead show the Photography Smart Folder.

Use Case—Initial Individual Smart Folder Construction:

When the smart folders are selected, each individual Smart Folder may include a set of applications. For example, if the user has several different work applications installed on their device, these work applications may automatically be placed into the "Work" Smart Folder. The user can now access all applications related to work in one place.

Use Case—New Application Installation:

If a user installs a new application related to a specific Smart Folder, the application may automatically be added to that Smart Folder. For example, if a work-related application (e.g., a DROPBOX application) is downloaded, the work application may be automatically added to the "Work" Smart Folder.

Use Case—New Application Installation Via Smart Folder

In accordance with various embodiments, Smart Folders also have the capability of suggesting new applications for a user based on the function of the Smart Folder. For example, if the user opened the Games Smart Folder, then clicked on the plus button, new Games applications (e.g. Angry Birds) may be displayed in the Games Smart Folder. The user can then install the application on their device directly from within the Smart Folder.

Use Case—Usage Based Optimization of Smart Folder

After the user has been using Aviate for some time, Aviate may learn which applications in a Smart Folder are being used (e.g., the frequency with which the applications in the Smart Folder are being used). Based on that usage, the applications inside the Smart Folder may be automatically rearranged such that the most used applications are placed at the top of the Smart Folder. For example, if the DROPBOX application was placed low inside of the "Work" Smart Folder, but then the user started using it a lot (more so than the other applications in the "Work" Smart Folder), the DROPBOX application may be automatically moved to the top of the Smart Folder, making it the most accessible for a user.

Use Case—Usage Based Optimization with Context

After the user has been using Aviate for some time, Aviate may learn which applications are being used by the user at specific times. Based on which applications are used by the user at various times, Aviate may display the most used applications on the homescreen at the appropriate time of day. For example, if the user always uses the New York Times application in the morning when waking up, Aviate will learn this. As a result, in the morning, the New York Times may be shown on the homescreen for the user to quickly access it.

Figure 8A:
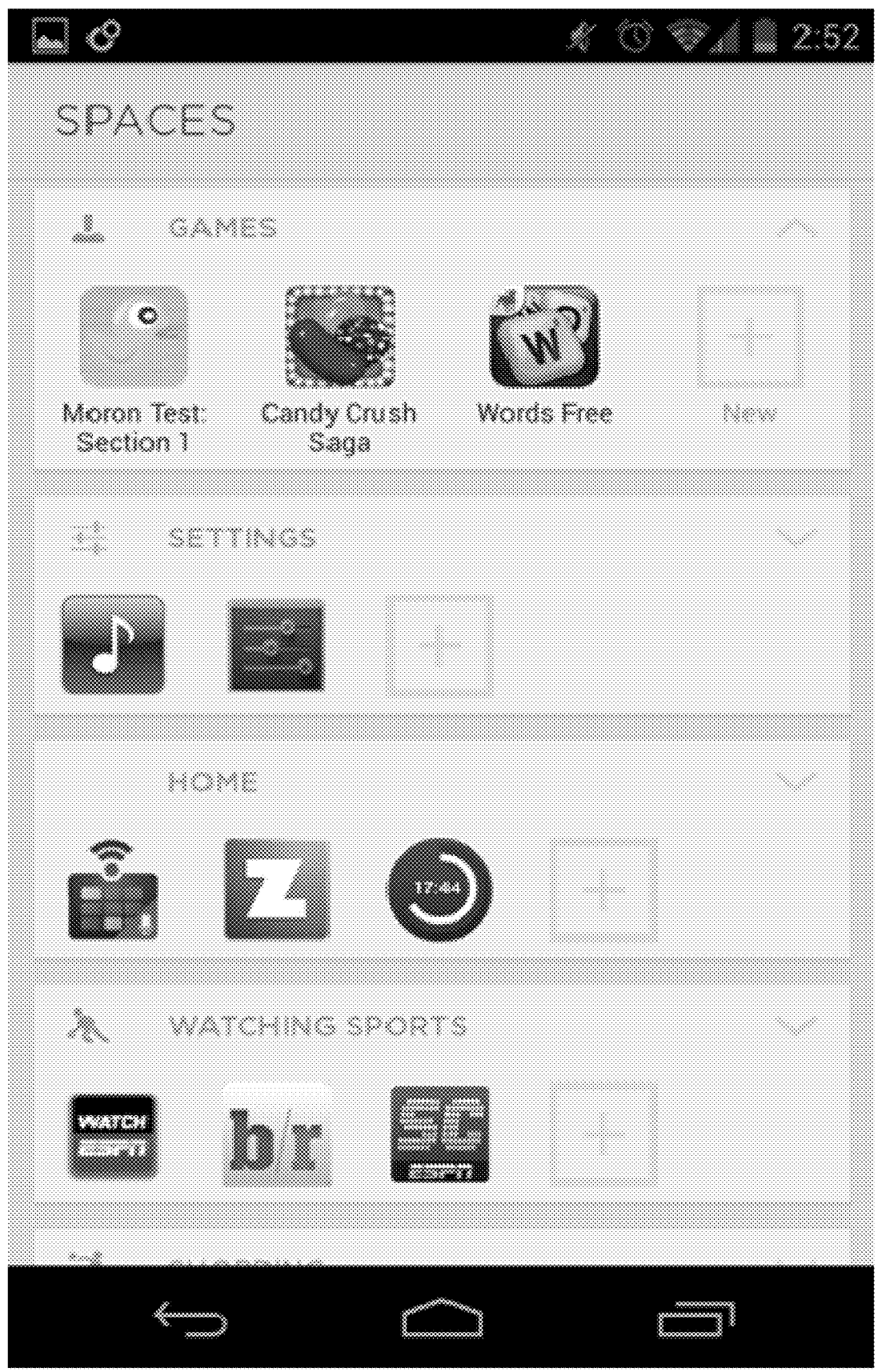
FIGS. 8A-8C are screen images showing an example context-based user interface, in accordance with some implementations.

As shown in FIG. 8A, a smart folders page (also called spaces) is displayed. In some implementations, a smart folder is organized based on the users contextual information (e.g., number of applications installed, how often they use the applications, etc.).

Figure 8B:
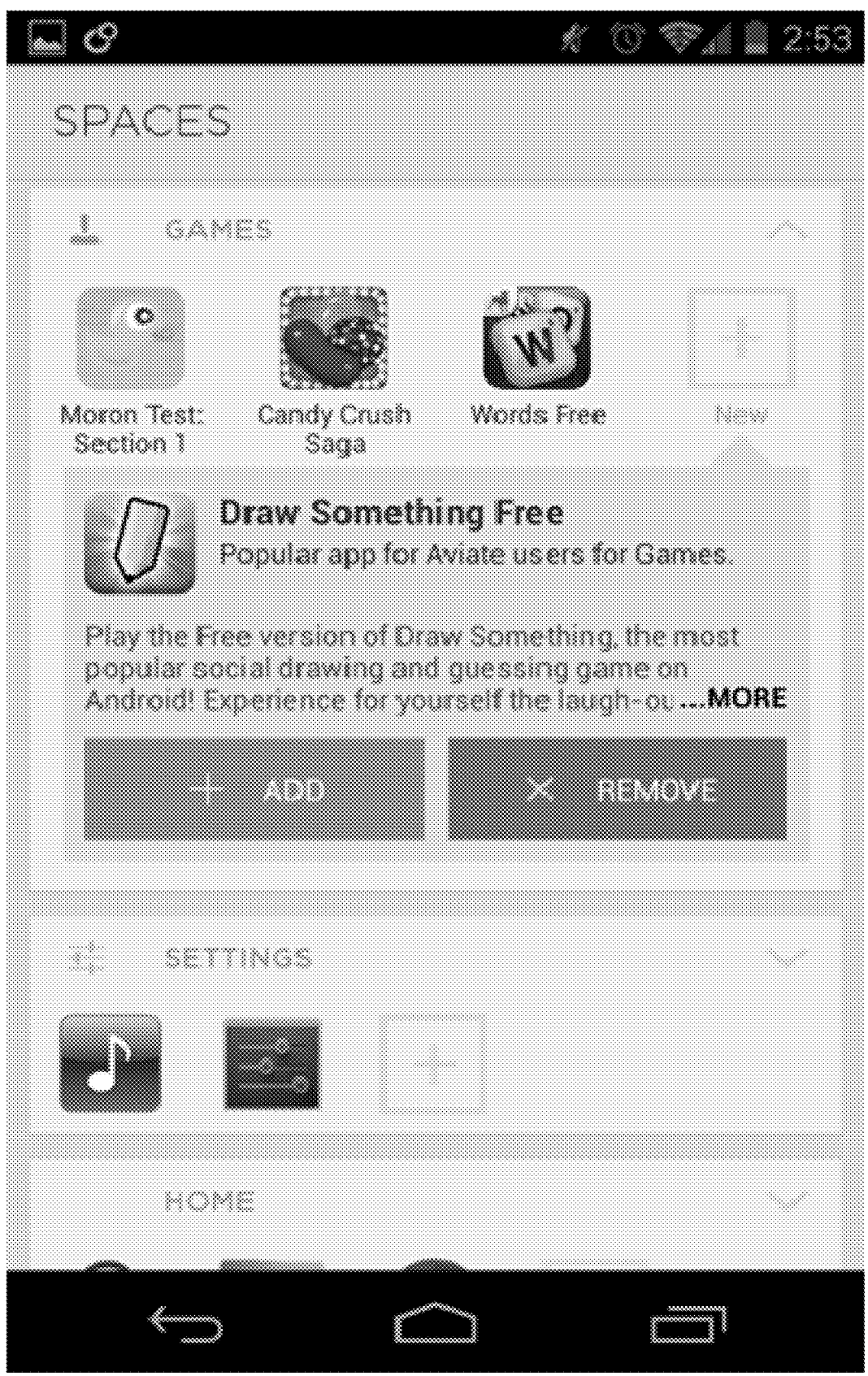

As shown in FIG. 8B, a user can drag and drop an application with respect to a smart folder. For example, a user can drag a drawing game application, Draw Something, to add the application to the smart folder. In this example, the user may press the plus button to add the drawing game application, Draw Something, to the smart folder (note Draw Something is not installed on the phone).

Figure 8C:
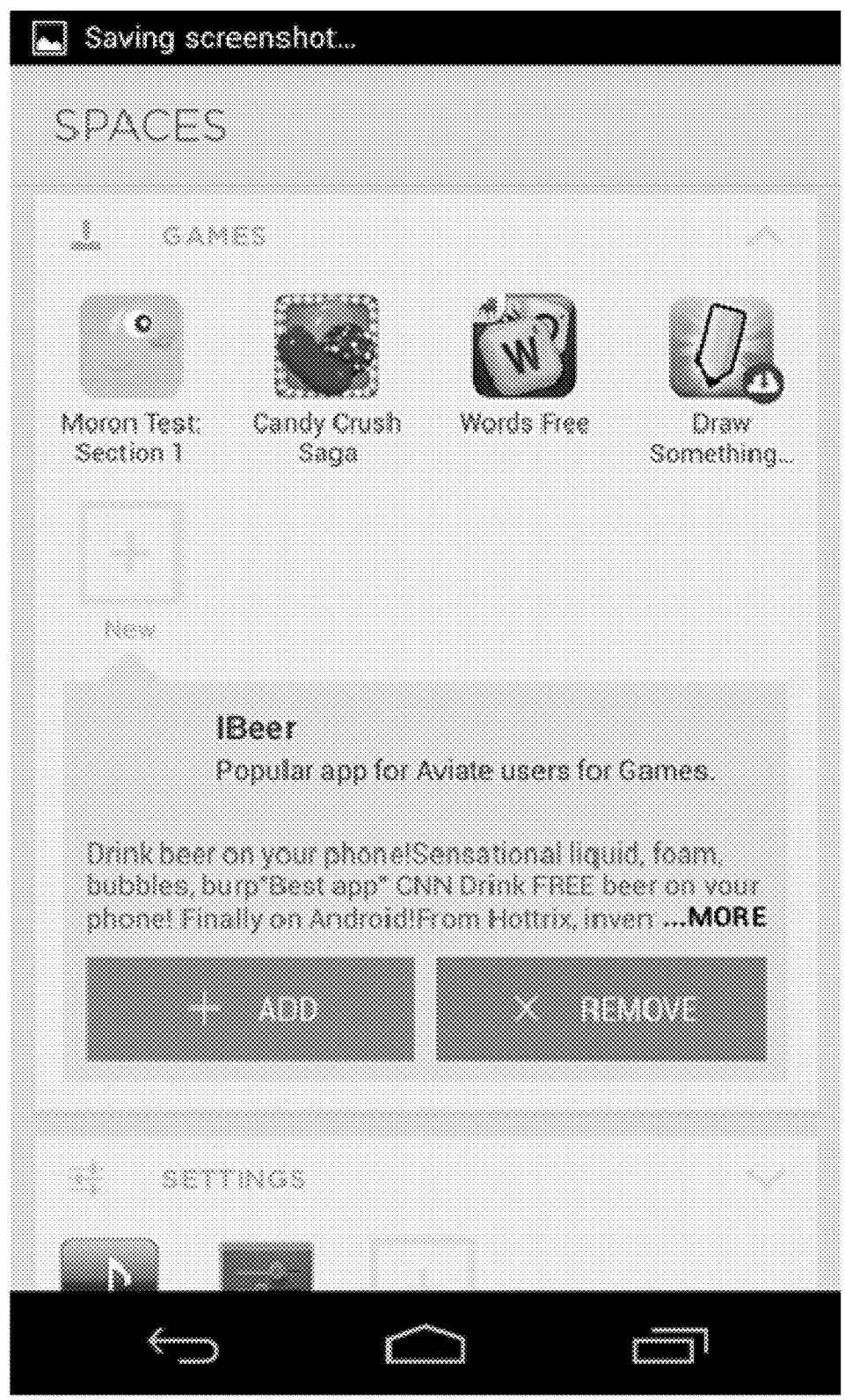

FIG. 8C shows the dragging of an application/document to add it to the smart folder. The drawing game application, Draw Something, is automatically added to smart folder and the user now has the option to add another game application (e.g. iBeer).

Figure 8D:
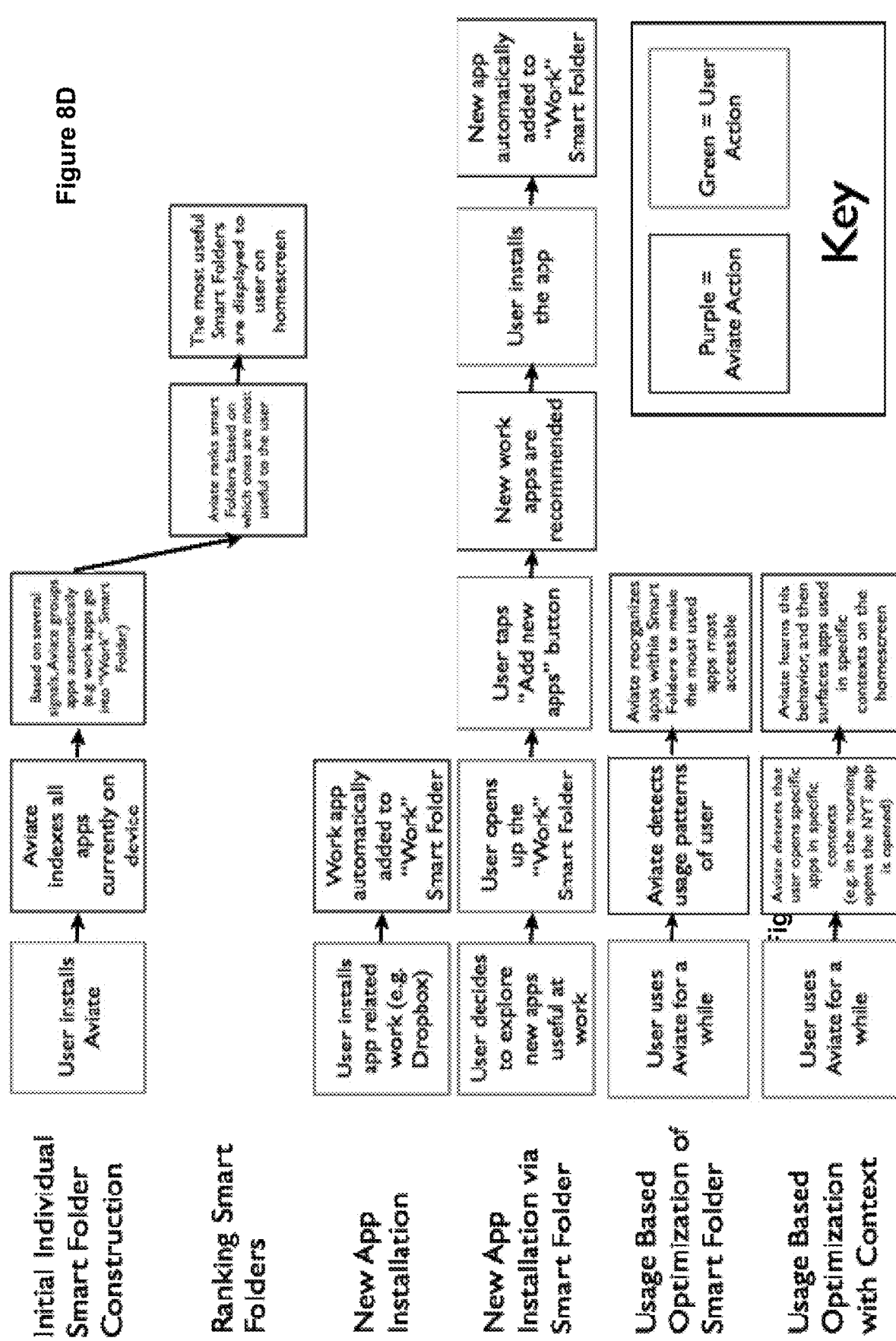
FIG. 8D is an example flowchart illustrating a method for providing a smart folder, in accordance with some implementations.

As shown in FIG. 8D, steps for providing and enabling smart folders are disclosed. An initial smart folder construction may be initiated when a user installs Aviate on an electronic device. Aviate may index all of the applications currently installed on the device. Based on several signals that are obtained, Aviate may automatically group the applications. For example, work applications may be grouped into a "Work" Smart Folder.

Aviate may rank the smart folders according to usefulness of the smart folders to the user. Aviate may display the smart folders that are most useful to the user on the homescreen.

When the user installs an application that is related to work (e.g., Dropbox), this work-related application may be automatically added to the "Work" Smart Folder.

The user may decide to explore new applications that might be useful at work. The user may open the "Work" Smart Folder. Upon tapping an "Add new applications" button, new work-related applications may be recommended. The user may choose to install one of the new work-related applications. The newly installed work-related application may be automatically added to the "Work" Smart Folder.

The user may use Aviate over a period of time. Aviate may detect usage patterns of the user, and may reorganize applications within the smart folders to make the most used applications most accessible based, at least in part, upon these usage patterns. In this manner, smart folders may be optimized.

Aviate may also detect when the user opens specific applications in specific contexts. For example, Aviate may detect that the user opens the New York Times application in the morning. Aviate may learn this behavior, and automatically display applications used in specific contexts on the homescreen according to the current context.

Live Action Bar

In some implementations, a method for displaying a two-view bar is provided.

In some implementations, View #1 is displayed, while View #2 is not displayed. For example, View #1 (i.e., Screen #1) can be a scrollable view or a static view. While View #2 (i.e., Screen #2) may be a scrollable view.

In some implementations, the Action Bar of View #1 may include an icon that is dynamic and indicates what information is contained in View #2 (Live Bar). In some implementations, when a gesture such as a scroll gesture is received on View #1, View #2 is displayed and View #1 is moved (e.g., pushed or shifted down).

In some implementations, if the gesture of the user is not completed, then View #1 shifts back up and View #2 disappears. In some implementations, when the scroll gestures are completed, View #2 is displayed and View #1 becomes deactivated.

In some implementations, based on a gesture such as a scroll or tap gesture on View #1, View #2 will be pushed back up to the top of the screen; and when the scroll or tap gesture is completed, View #2 is displayed and View #1 becomes deactivated Use Case #1:

In some implementations, when a user walks into a sushi restaurant, the live action bar changes to show a sushi icon in the top left. If the user wants to access the restaurant information they may swipe down on the main home screen to access information such as tips and recommendations, ratings, and/or applications that are useful in a restaurant setting.

Use Case #2:

In some implementations, when a user wakes up in the morning and pulls up their phone, the user homescreen changes to show a good morning icon. If the user swipes down on the main homescreen, they may get access to information that is useful in the morning. More particularly, this information may be automatically displayed on the homescreen. This information may include, but is not limited to, weather, meetings for the day, news headlines, and/or applications that are used frequently by that person in the morning.

Use Case #3:

In some implementations, when a user is driving in the car or riding on the train (or any other mode of transportation), the live action bar may change to display a going somewhere icon on the main homescreen. A user may perform a gesture such as a swipe gesture to get access to information such as directions home, directions to work, surrounding, traffic, cheap gas nearby, and/or applications that are useful while moving.

Figure 9A:
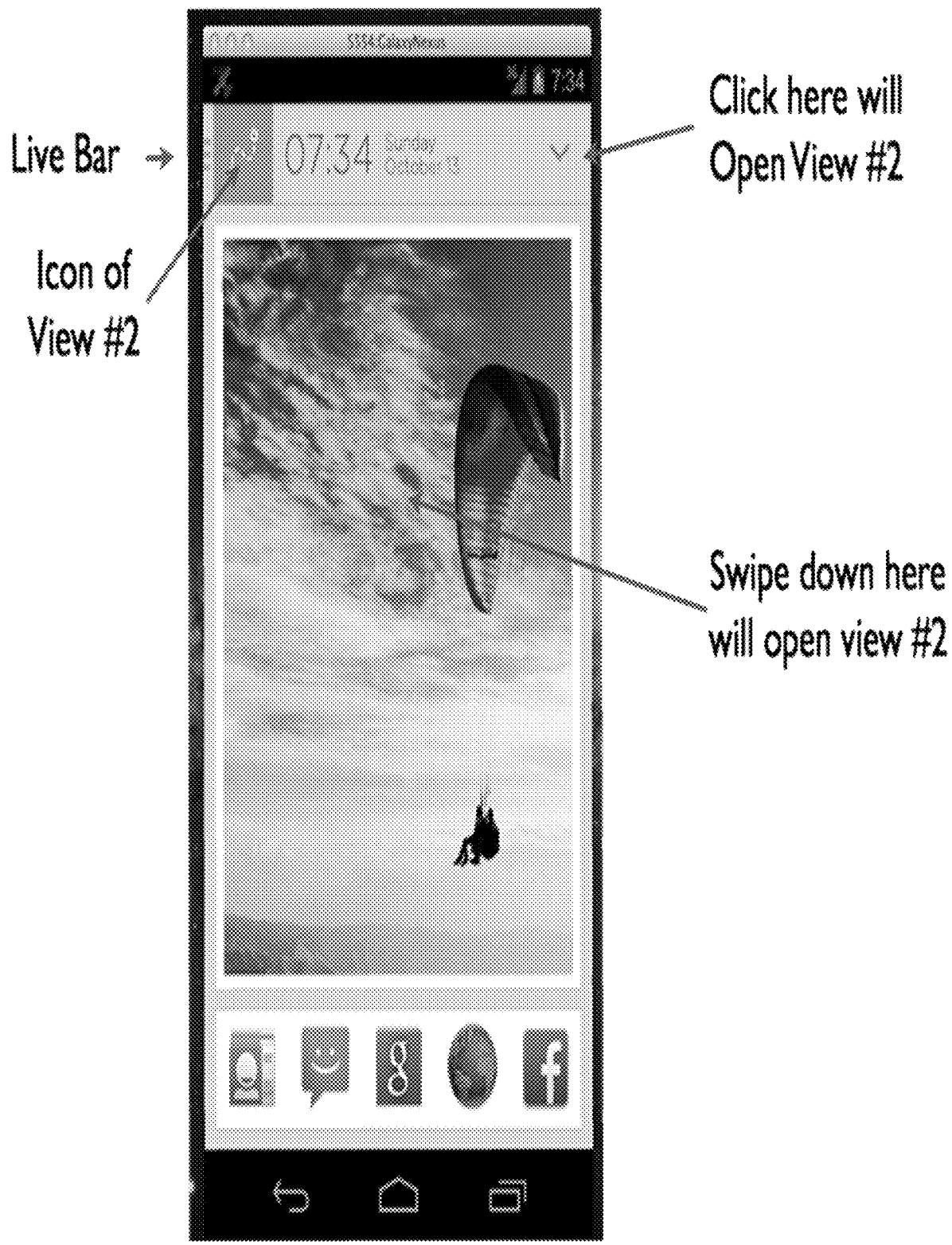
FIGS. 9A-9G are screen images showing an example context-based user interface, in accordance with some implementations.
Figure 9B:
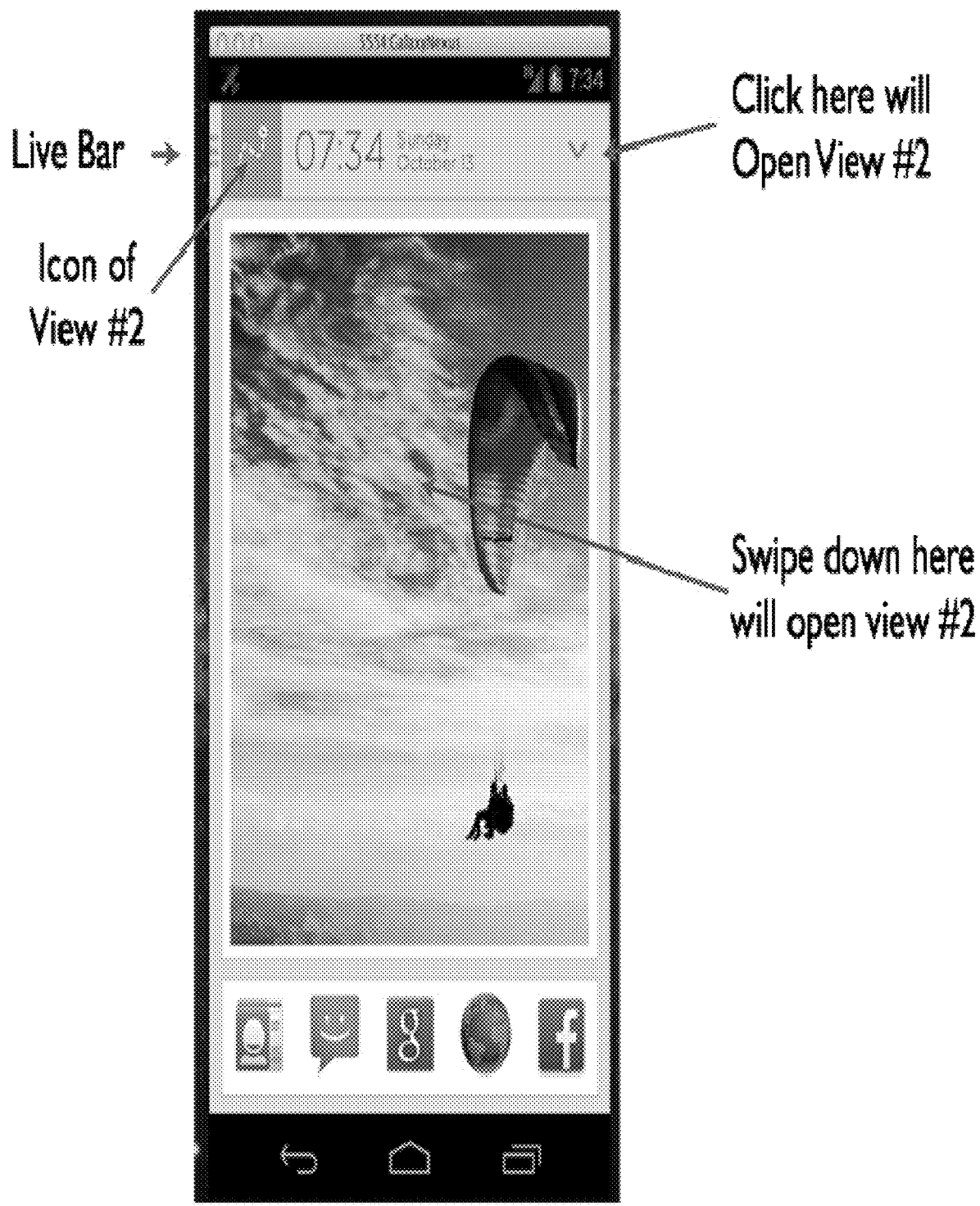

As shown in FIGS. 9A and 9B, View #1: There are two different ways to access View #2. The first way to access View #2 is to click on the top Live Bar row. As shown in these examples, an icon in the top left corner of the screen (in the Live Bar row) may indicate what content is in View #2 and an icon in the top right corner of the screen (in the Live Bar row) may indicate the state of View #2 (e.g., whether View #2 is closed). The second way to access View #2 is to swipe down within View #1.

Figure 9C:
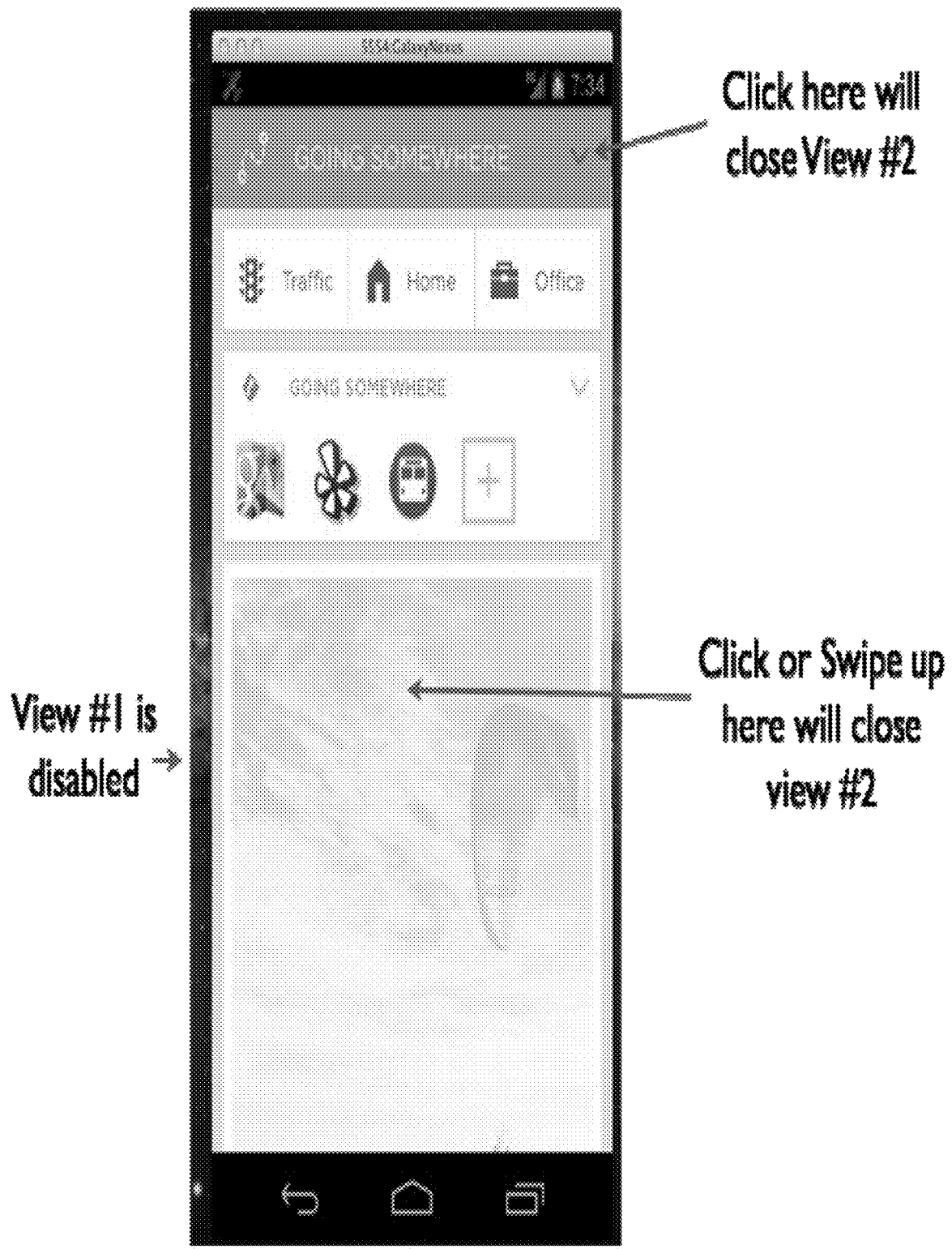
Figure 9D:
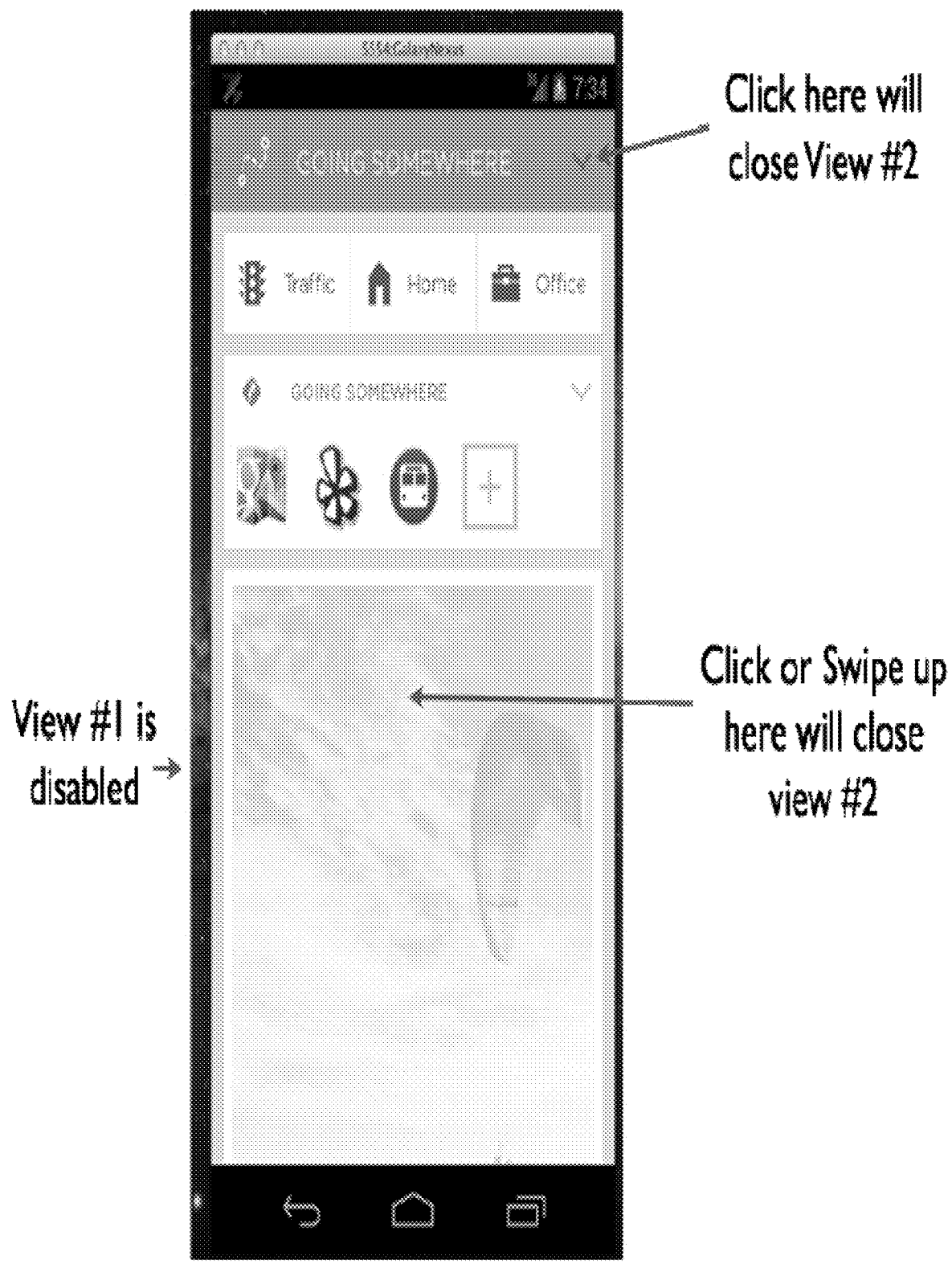

As shown in FIGS. 9C and 9D, View #2: There are several ways to return back to View #1 from View #2. The first way to return to View #1 is to click on the top live bar row. An icon in the top right corner of the screen may indicate that the state of View #2 is open. The second way to return to View #1 is to perform a gesture within View #2. For example, a user may return to View #1 from View #2 by performing a gesture such as swipe up within View #1 or click in View #1.

Figure 9E:
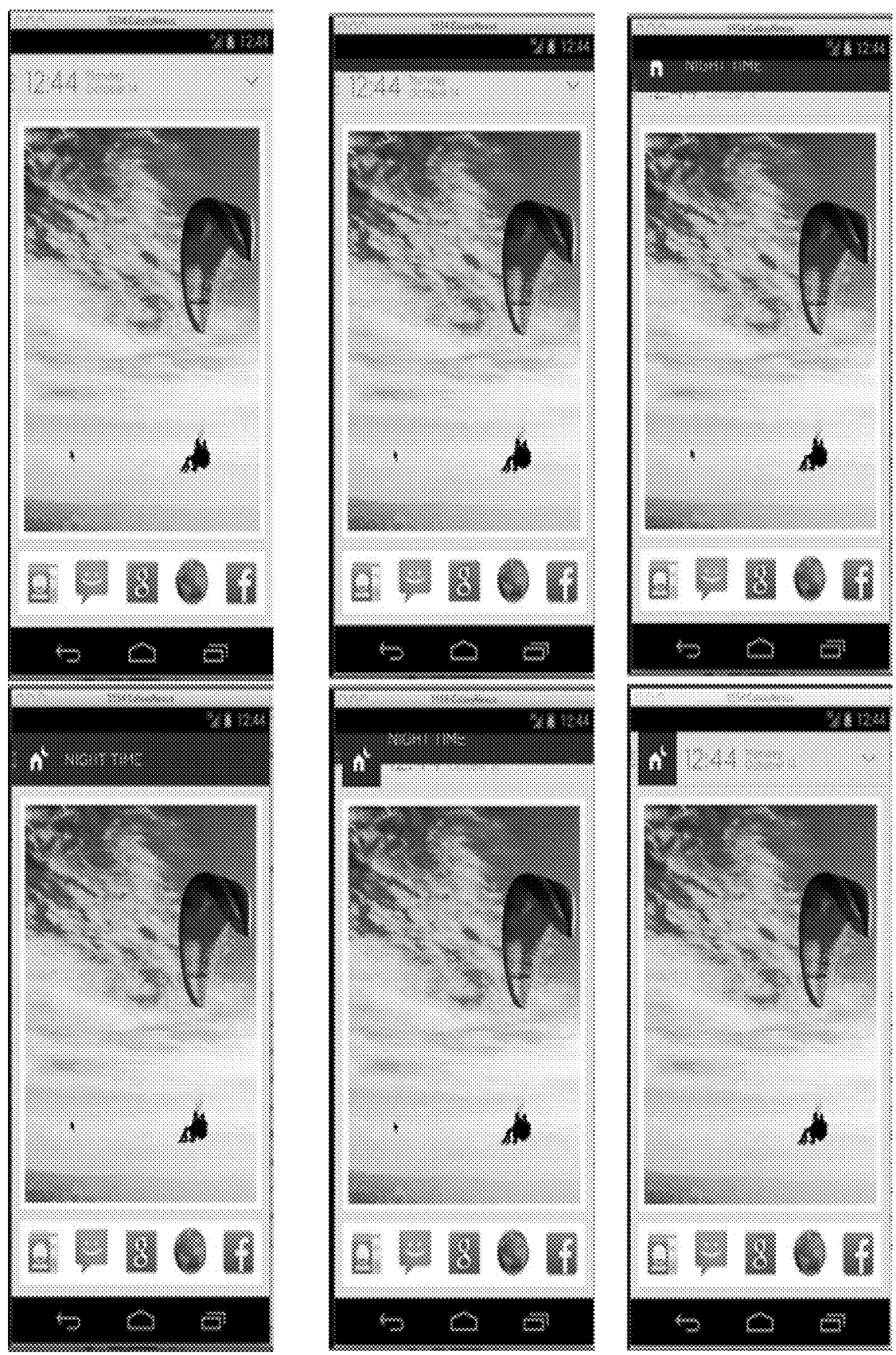

Shown in FIG. 9E is a diagram illustrating an example of how the information provided in the Live Bar may transition over time. Note that the change in information provided in the Live Bar is initiated in the absence of user input. In other words, the information provided in the Live Bar may change automatically when a new context is entered.

Figure 9F:
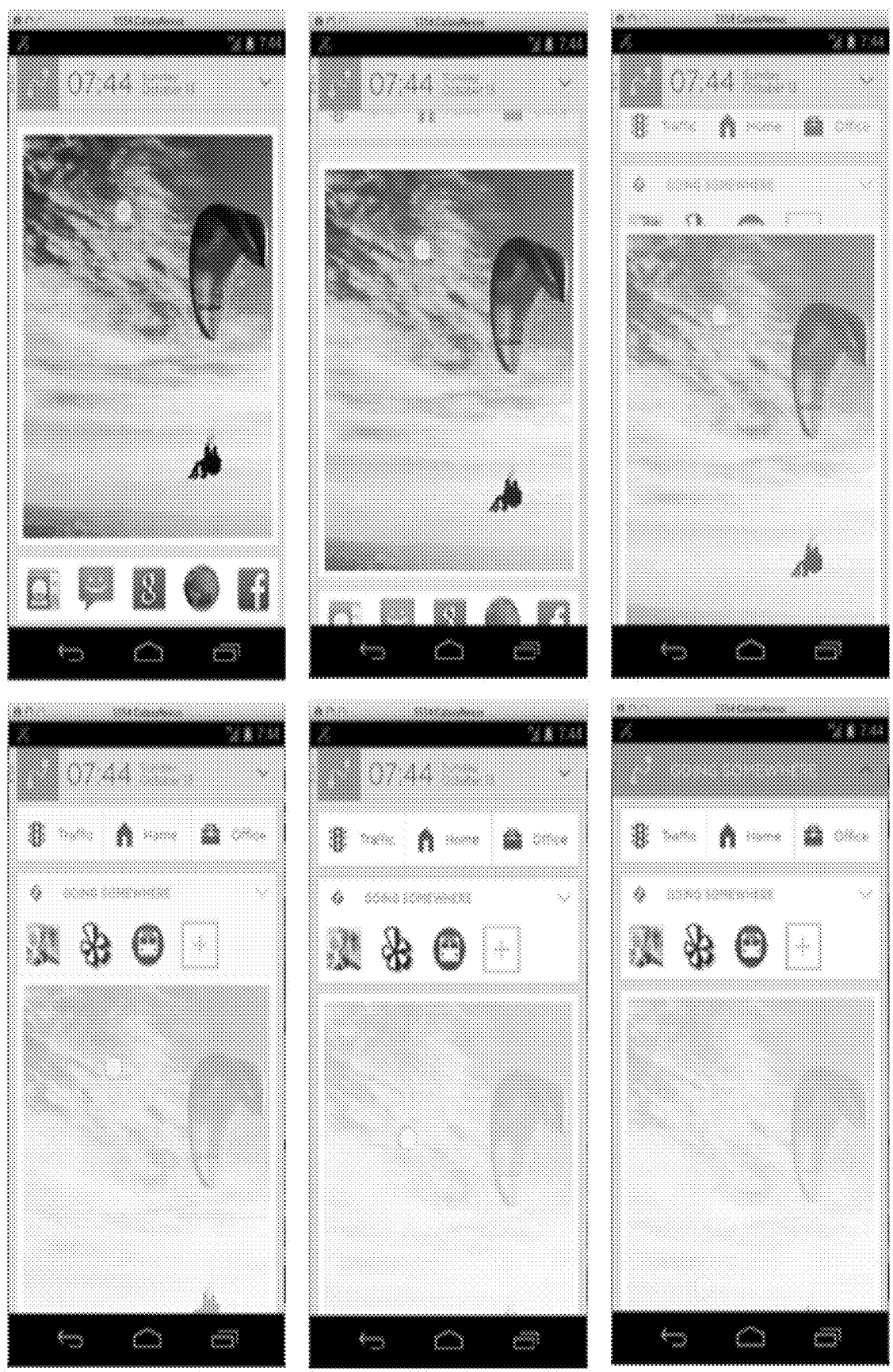

Shown in FIG. 9F is a diagram illustrating an example of how the transition between View #1 and View #2 may be performed. As shown in this example, View #1 may be shifted down to reveal View #2.

Figure 9G:
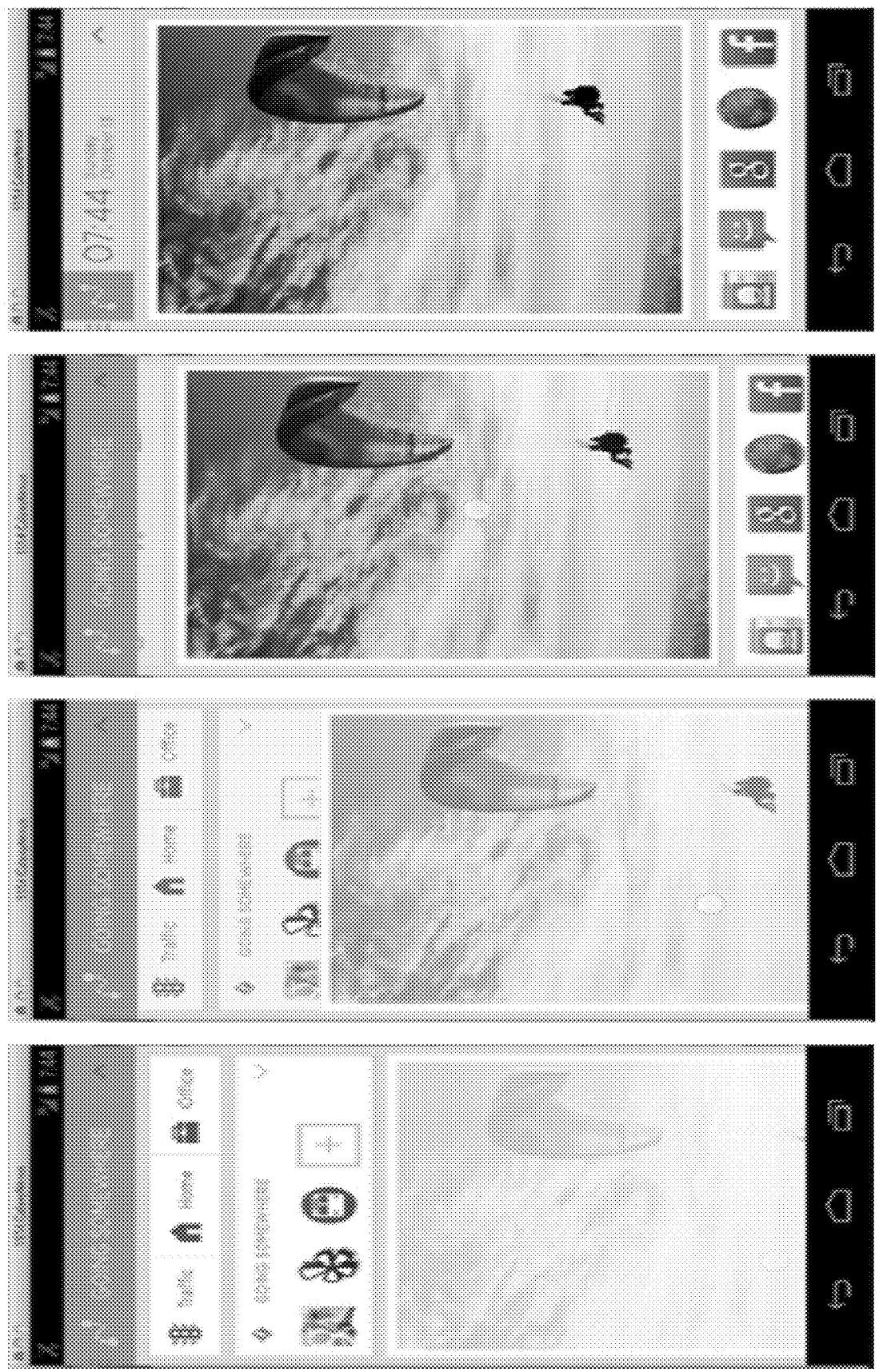

Similarly, shown in FIG. 9G is a diagram illustrating an example of how the transition between View #2 and View #1 may be performed. As shown in this example, View #1 may be gradually shifted upward to overlay View #2 until View #2 is eliminated.

New View on Side Scroll Gesture

In some implementations, View #1 is displayed, and View #2 is a scrollable view and may not initially be displayed. In some implementations, a scroll gesture may be received via a side of the screen of the device. In some implementations, based on the scroll gesture, View #2 may at least partially overlay View #1 and scroll proportional to the location of the gesture on the side of the screen of the device. In some implementations, when the scroll gesture is completed, View #2 remains visible.

Use Cases:

In some implementations, when a user installs Aviate, they may want to get access to all of their applications in addition to just their favorites. From the homescreen, the user may perform a side scroll gesture on the side of the screen to access the entire list of applications. They may continue to scroll up and down until they have located the application they are seeking. For example, if Dropbox is an application that is not in the user's favorite applications, the user may side scroll up or down until the user locates and opens the Dropbox application.

Figure 10A:
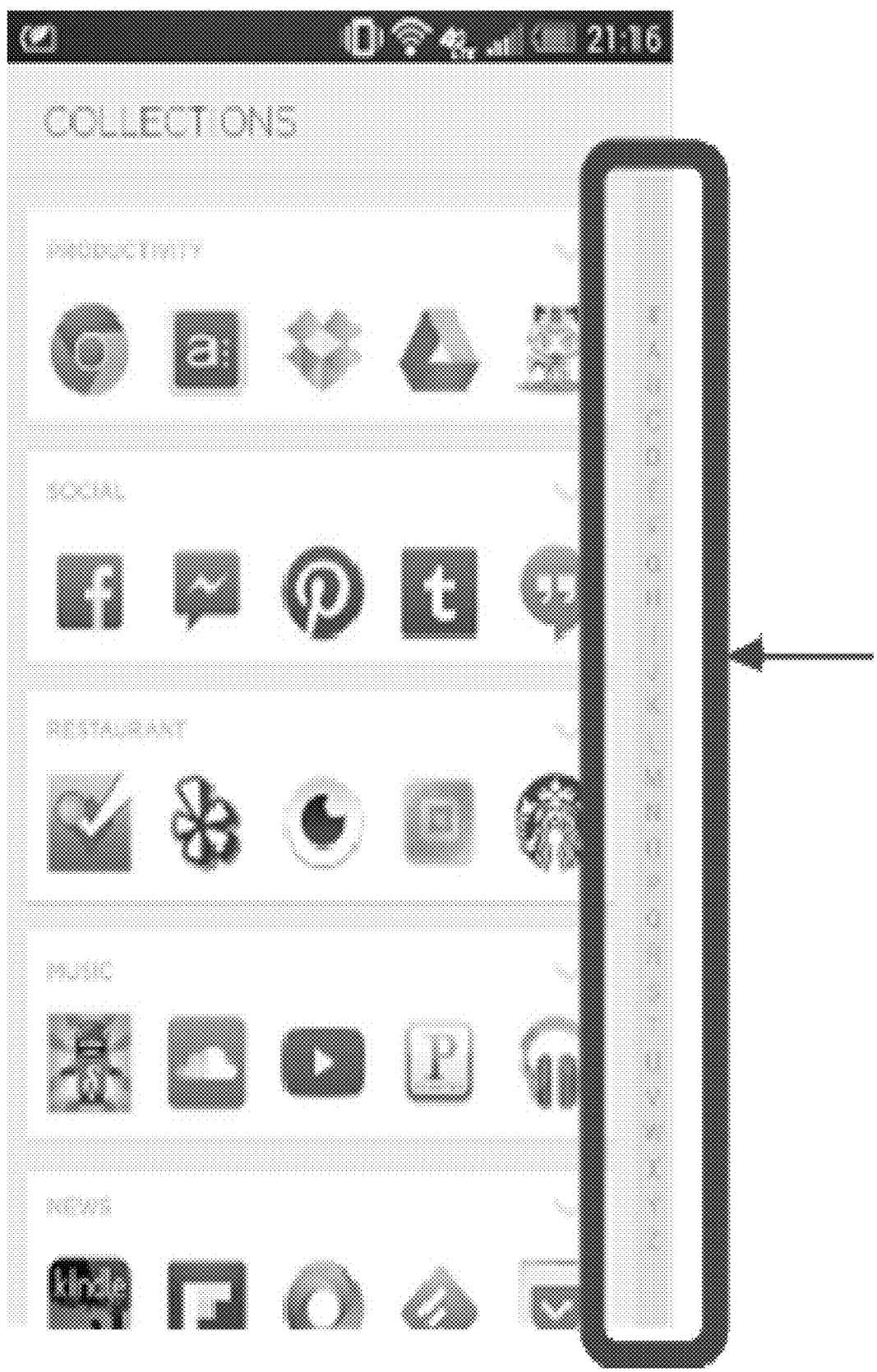
FIGS. 10A-10C are screen images showing an example context-based user interface, in accordance with some implementations.

As shown in FIG. 10A, View #1, when the user swipes in the circled area of the screen, View #2 may appear.

Figure 10B:
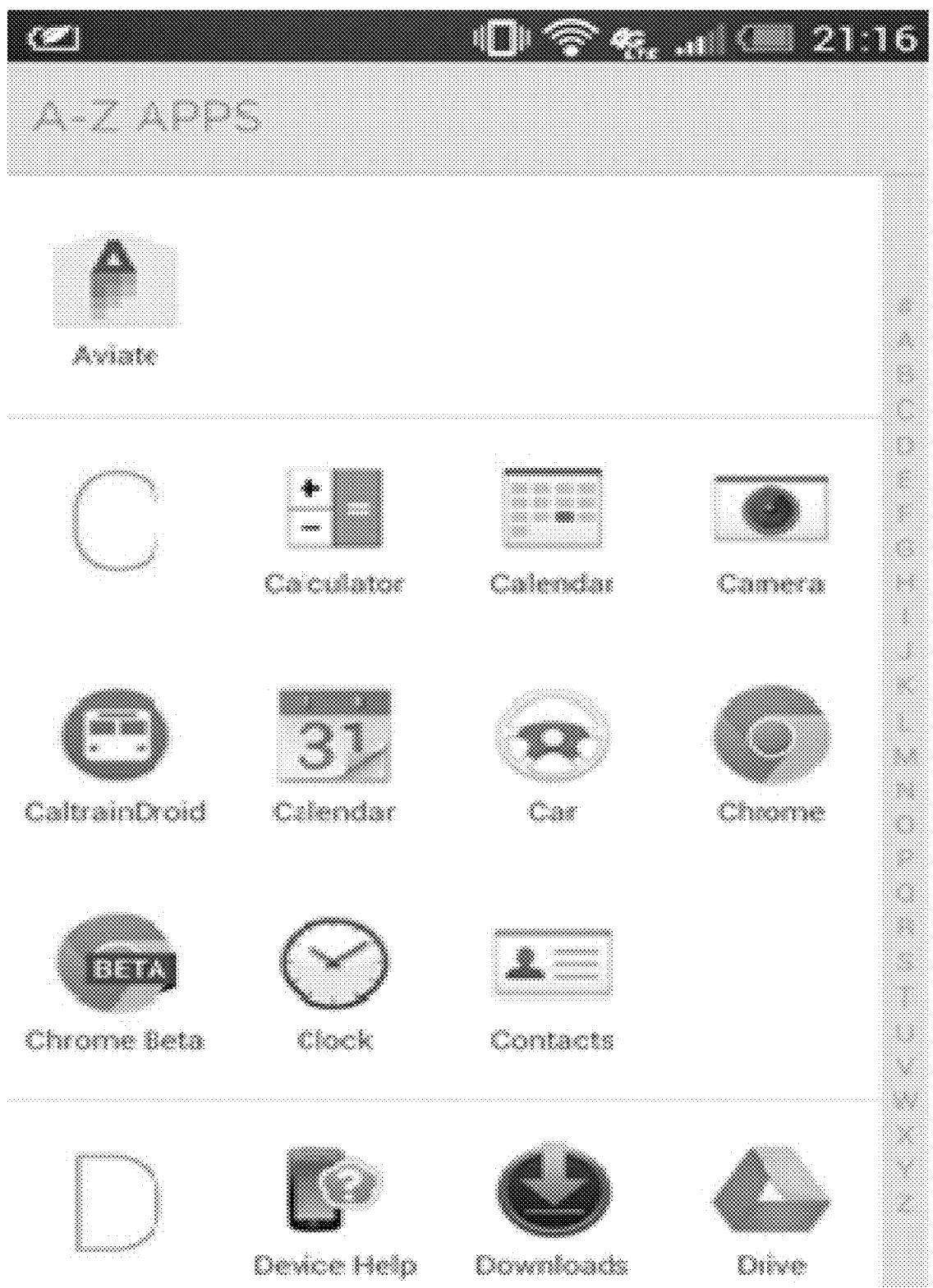

As shown in FIG. 10B, View #2, when users scrolls on the right hand side of View #1, View #2 may appear and scroll to the appropriate letter on the alphabet A-Z.

In some implementations, transitions between Views #1 and #2 may be performed.

Figure 10C:
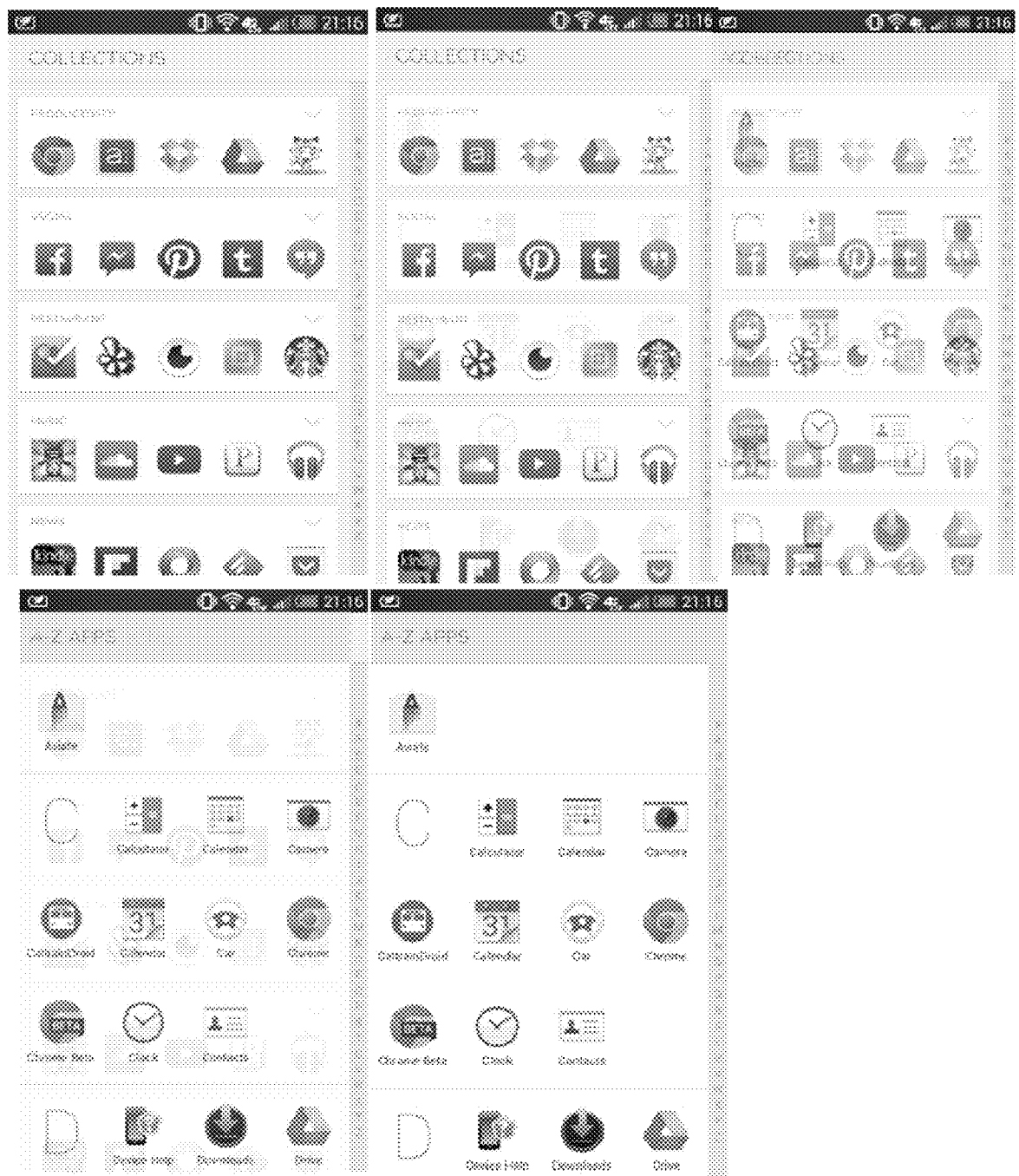

Shown in FIG. 10C is a diagram illustrating an example of how the transition between View #1 and View #2 may be performed. More particularly, as the user performs a scroll gesture, the user may access the entire list of applications, which are listed in alphabetical order in this example.

Other Features

In some implementations, a Pulldown to Select feature is provided. In some implementations, View #1 is displayed and View #2 is not initially displayed. View #2 may include a selector with multiple choices (e.g., a list). In some implementations, a gesture such as a scroll gesture may be received in View #1. In some implementations, based on the scroll gesture, View #2 begins to appear and the user may select one of the items. For example, the first entry on View #2 may be selected. In some implementations, based on the distance of the scroll gesture, the selection may change on View #2. In some implementations, when the scroll gesture is completed, the action corresponding to the selected item on View #2 is completed.

Figure 11:
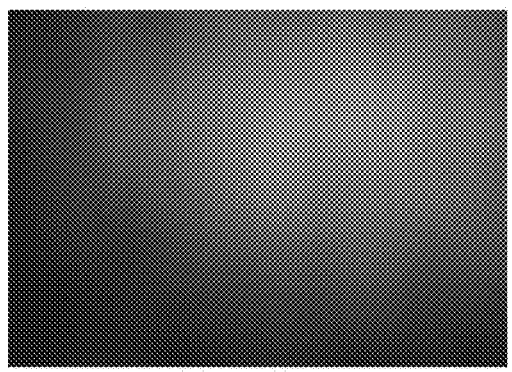
FIGS. 11-12 are screen images showing an example context-based user interface, in accordance with some implementations.
Figure 11:
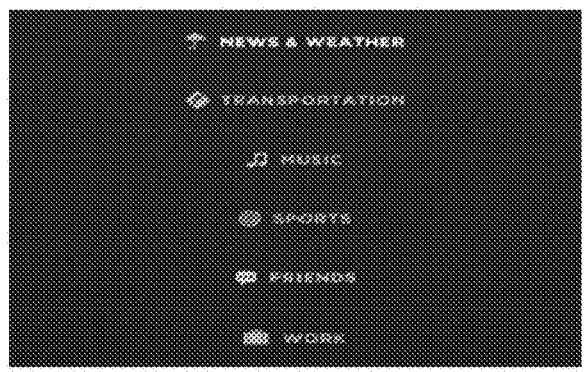
Figure 11:
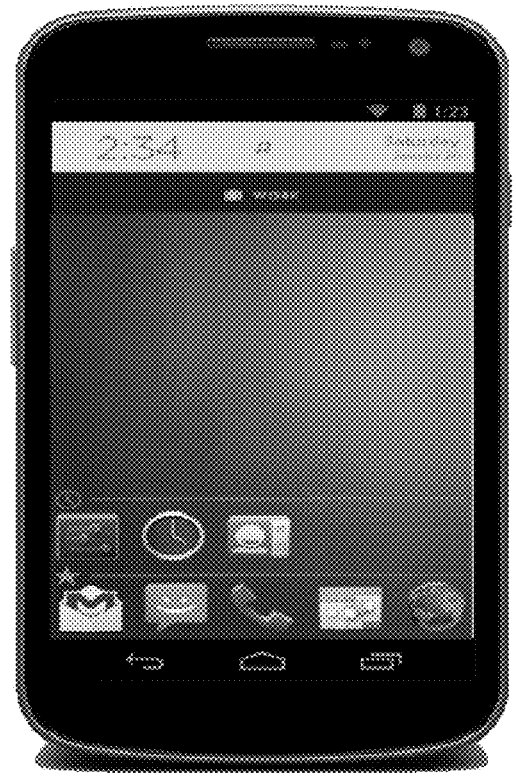
Figure 11:
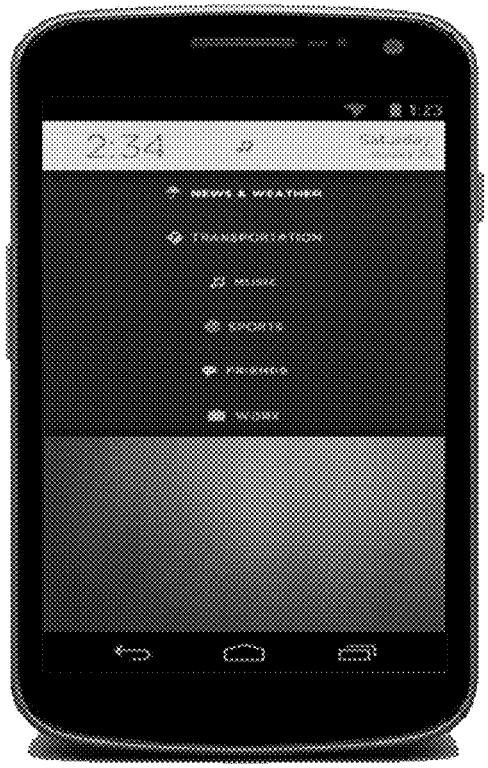
Figure 11:
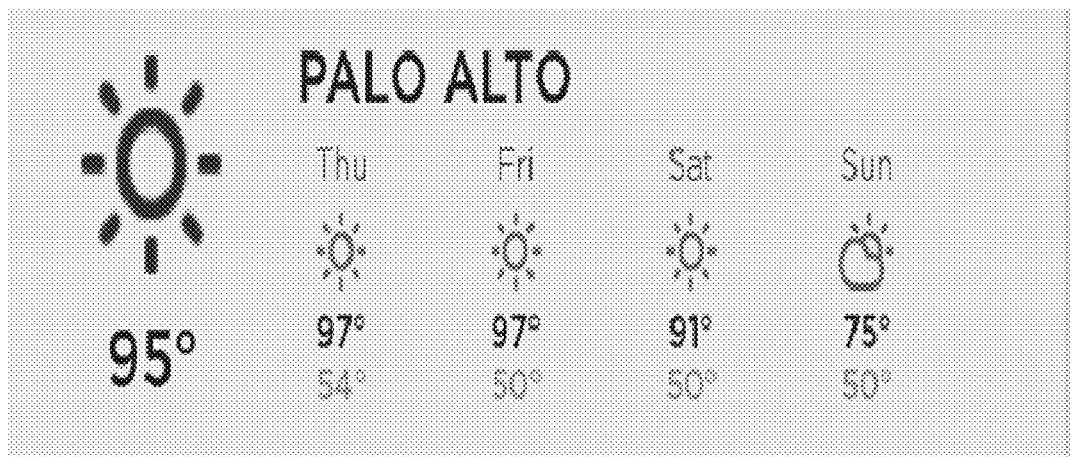

As shown in FIG. 11, View #1 may simply be the basic background and View #2 may provide a list of items from which the user may select a context. In this example, the list of items includes News & Weather, Transportation, Music, Sports, Friends, and Work. In this manner, the user may select a context from a plurality of contexts.

As shown in FIG. 11, based on a scroll gesture performed by a user while viewing View #1, View #2 begins to appear and the Work context is selected by the user.

As shown in FIG. 11, the user may continue to perform a scroll gesture, and based on the distance of the scroll gesture, the selection may change on View #2. In this example, the user selects Weather from the list of possible items.

As shown in FIG. 11, when the scroll gesture of the user is completed, the action corresponding to the selected item on View #2 is completed. In this example, the weather is shown.

In some implementations, a Quick Action Gesture feature is provided. In some implementations, View #1 is displayed, and View #2 is not initially displayed and corresponds to a user action (e.g. Check In, Call Mom, Take Picture, etc. . . . ).

In some implementations, a gesture (scroll or swipe) may be received on View #1, enabling a user to access View #2. View #2 may begin to appear on the screen proportional to the length of the gesture. In some implementations, after the gesture is completed, if the gesture is deemed to be long enough, View #2 may take control of the screen and an action associated with View #2 may be performed. If the gesture is not long enough, then View #1 may shift back onto the display.

Figure 12:
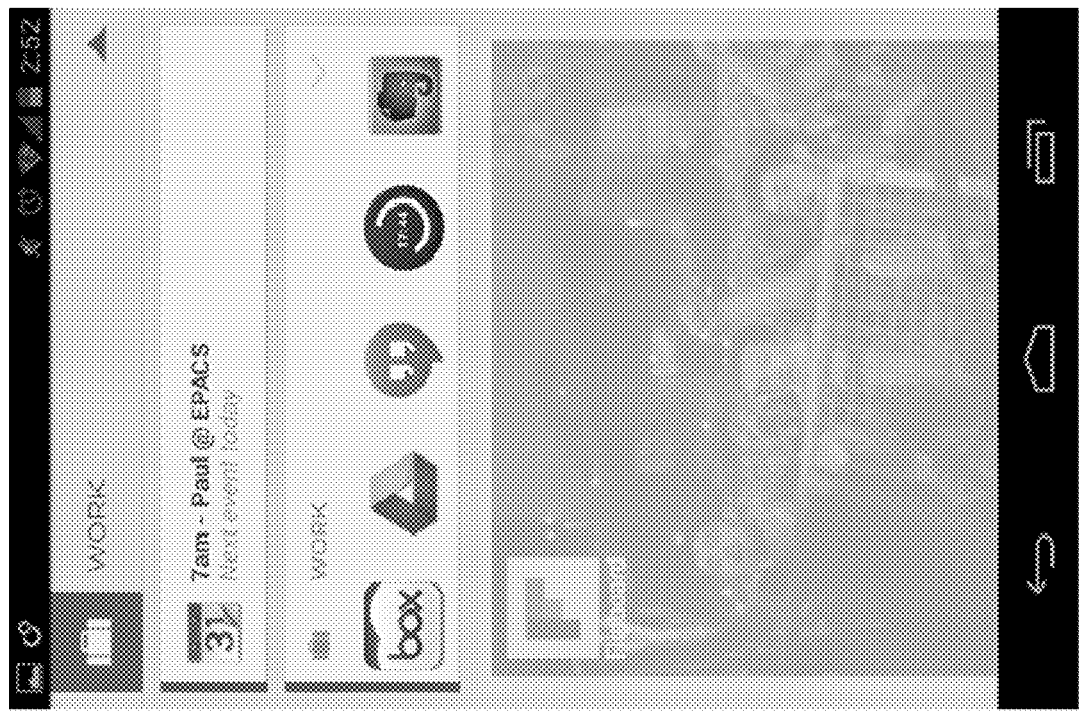
Figure 12:
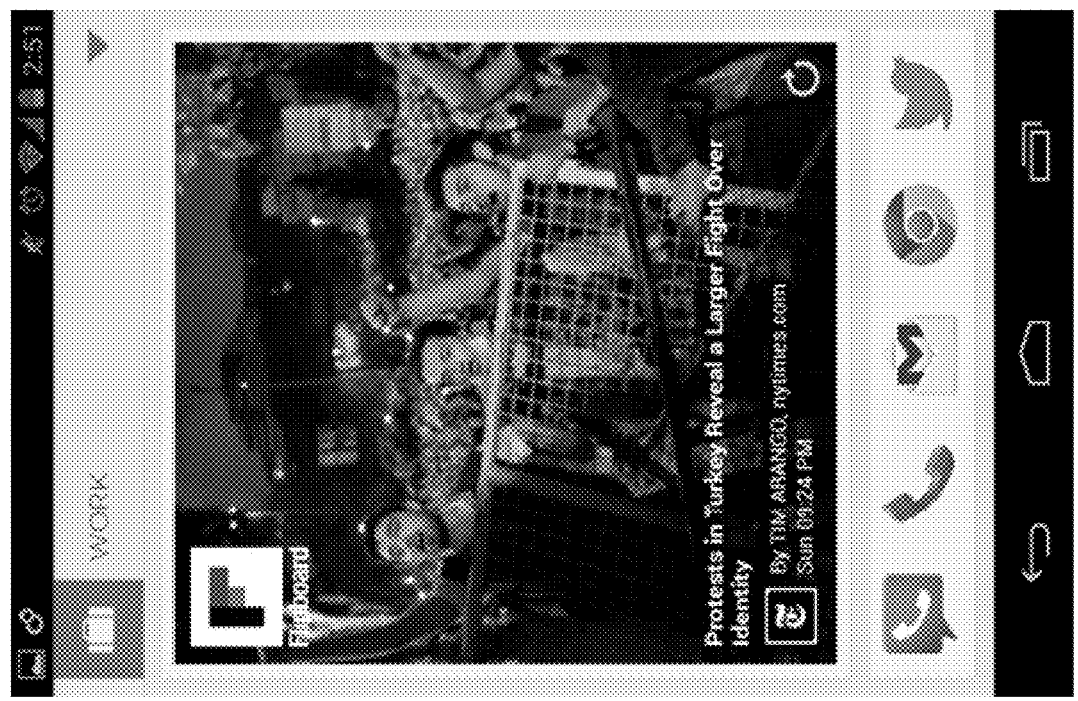

In some implementations, a Double Tap on Home feature is provided. In some implementations, two different main home screen views (Home Screen #1 and Home Screen #2) may be displayed. Examples of Home Screen #1 and Home Screen #2 are shown in FIG. 12. In some implementations, when the home button is pressed, Home Screen #1 is shown. In some implementations, when Home Screen #1 is shown and the home button is pressed, Home Screen #2 is shown. In some implementations, when Home Screen #2 is shown and the home button is pressed, Home Screen #1 is shown. Therefore, the home button may enable a user to toggle between the different main home screen views.

EXAMPLE IMPLEMENTATIONS

(A). Space

In some implementations, a space is defined as an organizational unit on an electronic device (e.g., a smartphone) that houses relevant information for a given context (e.g. work, home, going somewhere, restaurant). In some implementations, the space includes both static and dynamic content, which are presented as a feed of cards. In some implementations, a space is designed to be accessible and is triggered automatically, without user intervention/input.

In some implementations, a space includes one or more of the following example properties:
- Name;
- Icon (e.g. small or tintable);
- Color;
- (Optional) Header image;
- (Optional) Header title;
- (Optional) User-defined header background;
- Quick Actions: 1) Deep-linking into another application, or 2) Binary toggle: which in some implementations include:
  - Label;
  - Icon (e.g., small or tintable);
  - Intent;
  - Optional) Long-press intent; and
  - Index, and
- Cards, which in some implementations include:
  - Type;
  - Index; and
  - Extras.

(B). Card

In some implementations, a card includes one or more of the following example properties:
- Collection; Collection of applications useful in this context.
  - collection_id
  - expanded
- AppWidget: Standard android widgets. May be rendered as placeholder before it is added.
  - component_name
  - appwidget_id
  - placeholder_label
- RemoteExtension: Extension whose data is supplied from computer system 106, e.g., Foursquare tips
  - extension_name
  - extension_data
- LocalExtension: Extensions whose data is supplied client-side. e.g. calendar. Essentially AppWidge but no need for users to add it.
  - component_name
  - appwidget_id
  - placeholder_label
- SpaceLink (not in v1): Link to another space
  - space_id

(C). Internal Application Programming Interface (API)

In some implementations, internal APIs are synchronized between an electronic device 102 and the computer system 106. In some implementations, changes to the internal APIs that occur on the electronic device 102 are replicated on the computer system 106, and vice versa.

Models

```
Space {
  id,
  CharField string name,
  CharField icon_url,
  IntegerField color,
  CharField header_image_url,
  CharField header_title,
  ManyToManyField quick_actions,
  ManyToManyField cards,
  IntegerField index,
  BoolField visible
}
QuickAction {
  id,
  CharField label,
  CharField icon_url
  CharField click_intent,
  CharField long_press_intent,
  IntegerField index
}
Card {
  id,
  CharField component_name,
  CharField placeholder_label,
  Blob? configData,
  IntegerField index,
  BoolField visible
}
```

Endpoints

```
/api/v4/devices/<device_id>/sync/?last_sync_time=0
On a first request, there may be a static template that defines
the JSON for a default set of spaces
and their cards. This JSON may be sent down for new devices.
Subsequent requests may send down only updated spaces.
Request/Response
{
  "spaces": [
    {
      <space_json>
    },
    ...
  ],
  //
  "collections": [
    {
      <collection_json>
    },
    ...
  ],
  "visible_collections_order": [3, 1],
  "installed_activities": [ "com.tul.aviate", ... ]
}
/api/v4/devices/device_id>/now
Dynamic/contextual parts may be sent in a request/response.
If a space is one of the static ones already on the client, this
may update that space. It may be added as a static card via a sync request.
The endpoint may fill/unfill that card, which might show/hide it.
Request:
{
  "context": {
    "lat": 37.42577,
    "lng": 122.13863,
    "speed": 3,
    "location_override": {
      "name": "ThumbsUp Labs",
      "fsq_id": abcd4567,
      "category": "Tech Startup",
    }
    ...
  }
}
Response:
{
  "contextual_spaces": [
```

```
{
    <space_json>
  },
  ...
  ]
}
Space Json:
{
  "name": "Work",
  "icon_ url":"",
  "cards": [ ... ],
  ...
}
```

(D). Extension API

In some implementations, extension APIs are built on top of the core AppWidget framework.

In some implementations, widgets broadcast RemoteViews parcels to make them internally accessible, thereby adding widgets to a user interface, without requiring user manual action.

In some implementations, AviateRemoteViews are subclasses of RemoteViews, and can serialize/deserialize JSON to itself. This allows RemoteViews to be downloaded to the electronic device 102 from the computer system 106.

In some implementations, some User Interface (UI) types (e.g. action rows) are displayed as idioms in AviateRemoteViews in order to maintain the low API payload.

In some implementations, AppWidgets are customized (e.g., paired with) with custom remote views (e.g. horizontal swipe list).

In some implementations, third-party support is not enabled. In some implementations, first-party cards are programmed using a public accessible (e.g., an open-source) framework, so as to increase the number of applications available.

(D). Client Structure

In some implementations, some platforms are designed to be releasable as an external Software Development Kit (SDK).

In some implementations, AviateAppWidgetProvider extends AppWidgetProvider, and AviateAppWidgetManager extends AppWidgetManager. These approaches provide hooks for a regular widget to broadcast RemoteViews parcels to Aviate.

In some implementations, convenience classes for common UI types are constructed, e.g. AviateActionWidgetProvider, AviateImageWidgetProvider In some implementations, AviateWidgetUpdateReceiver receives widget update broadcasts from the platform and hands them off to AviateWidgetManager.

In some implementations, AviateWidgetHost keeps track of widget views and manages updates to them. In some implementations, AviateWidgetHost renders AviateRemoteWidgetData.

In some implementations, AviateRemoteWidgetData includes JavaScript Object Notation (JSON)-serializable data that can be rendered as a user interface. In some implementations, AviateRemoteWidgetData is downloaded to an electronic device 102 from a computer system 106.

In some implementations, CardView extends AppWidgetHostView. In some implementations, a card is an extension of AppWidget view. In some implementations, all updates will be provided as a RemoteViews object, regardless of the source (local or remote).

In some implementations, first-party extensions are enabled. In some implementations, Local extensions are substantially similar to widgets by extending AviateAppWidgetProvider.

In some implementations, remote extensions send JSON-serializable data with a pre-defined structure that is deserialized to AviateRemoteWidgetData. In some implementations, remote extensions are similar to current HeroData.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first set of applications could be termed a second set of applications, and, similarly, a second set of applications could be termed a first set of applications, without changing the meaning of the description, so long as all occurrences of the "first set of applications" are renamed consistently and all occurrences of the "second set of applications" are renamed consistently. The first set of applications and the second set of applications are both sets of applications, but they are not the same set of applications.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
indexing, without user intervention, each application of a first plurality of applications installed on an electronic device according to a plurality of folders;
updating at least one folder of the plurality of folders to generate an updated folder such that the updated folder includes at least a subset of the first plurality of applications installed on the electronic device;
obtaining one or more contextual factors associated with the electronic device;
predicting context information in accordance with the one or more contextual factors;
formatting a user interface on the electronic device in accordance with the context information such that the user interface includes a representation of one or more folders of the plurality of folders;
obtaining an indication of user input associated with a first folder of the one or more folders;
determining an application category associated with the first folder, wherein the application category associated with the first folder corresponds to at least one of game applications, work applications or photography applications;
responsive to determining the application category associated with the first folder, providing suggestions for installation of one or more additional applications based, at least in part, on the context information and the application category associated with the first folder such that representations of the one or more additional applications are displayed within the first folder, wherein the one or more additional applications comprise at least one of a first game application, a first work application or a first photography application;
obtaining a second indication of second user input associated with a second folder of the one or more folders;
determining a second application category associated with the second folder, wherein the second application category associated with the second folder corresponds to at least one of game applications, work applications or photography applications, wherein the second application category is different than the application category; and
responsive to determining the second application category associated with the second folder, providing suggestions for installation of one or more second additional applications based, at least in part, on the context information and the second application category associated with the second folder such that representations of the one or more second additional applications are displayed within the second folder, wherein the one or more additional applications comprise at least one of a second game application, a second work application or a second photography application;
wherein the user interface includes a homescreen.

2. The method of claim 1, wherein the electronic device is a computing device performing the method.

3. The method of claim 1, wherein:
the one or more additional applications comprise one or more new applications not installed on the electronic device at a time of the providing suggestions for installation of the one or more additional applications; and
the one or more second additional applications comprise one or more new second applications not installed on the electronic device at a second time of the providing suggestions for installation of the one or more second additional applications.

4. The method of claim 1, comprising:
selecting, in accordance with the context information, a first set of applications from a second plurality of applications not installed on the electronic device;
wherein providing suggestions for the one or more additional applications includes formatting, for display to a user, representations of the first set of applications within the first folder.

5. The method of claim 1, wherein formatting the user interface on the electronic device in accordance with the context information comprises:
selecting, in accordance with the context information, a second set of applications from a second plurality of applications; and
forgoing displaying, to a user, the second set of applications as part of the user interface of the electronic device.

6. The method of claim 5, wherein forgoing displaying, to the user, the second set of applications as part of the user interface of the electronic device comprises:
hiding from display the second set of applications as part of the user interface of the electronic device.

7. The method of claim 1, wherein the one or more contextual factors comprise at least one of:
an environment factor, a speed factor, a weather factor, an altitude factor, a location factor, a device factor, a time factor, or a user profile.

8. The method of claim 7, wherein the location factor comprises at least one of:
a recent location of the electronic device;
a past location of the electronic device;
a current location of the electronic device; or
a distance between the current location and the past location of the electronic device.

9. The method of claim 7, wherein the device factor comprises at least one of:
a network connection status of the electronic device;
a signal reception status of the electronic device;
a plurality of messages sent from or delivered to the electronic device;
a history of applications executed on the electronic device;
a history of user interactions with the user interface of the electronic device;

a history of user interactions with applications displayed on the user interface of the electronic device;
an audio cable connection of the electronic device;
a charging cable connection of the electronic device; or
a history of user notifications displayed on the electronic device.

10. The method of claim 7, wherein the time factor comprises at least one of:
a time of day associated with the electronic device;
a day of week associated with the electronic device;
a day of month associated with the electronic device;
a month associated with the electronic device; or
a season associated with the electronic device.

11. The method of claim 7, wherein the weather factor comprises at least one of:
a temperature associated with the electronic device;
a rain factor associated with the electronic device;
a snow factor associated with the electronic device; or
a wind factor associated with the electronic device.

12. The method of claim 1, wherein formatting the user interface on the electronic device in accordance with the context information comprises:
clustering electronic messages.

13. The method of claim 1, comprising:
in response to installation of an application associated with the application category on the electronic device, adding, without user intervention, a representation of the application to the first folder.

14. The method of claim 1, comprising:
installing at least one of the one or more additional applications onto the electronic device.

15. The method of claim 1, comprising:
auto-creating at least one of the plurality of folders.

16. The method of claim 1, wherein formatting the user interface on the electronic device in accordance with the context information comprises:
organizing applications within the representation of the one or more folders.

17. The method of claim 1, the indication of user input indicating a request for application recommendations.

18. The method of claim 1, wherein updating is performed such that each application of the first plurality of applications is included in a corresponding one of the plurality of folders.

19. The method of claim 1, the one or more folders of the plurality of folders including the updated folder, the first folder being the updated folder.

20. A computing system, comprising:
one or more processors;
memory; and
one or more programs, wherein the one or more programs are stored in the memory and configured to be executed by the one or more processors, the one or more programs including instructions for:
indexing, without user intervention, each application of a first plurality of applications installed on an electronic device according to a plurality of folders;
updating at least one folder of the plurality of folders to generate an updated folder such that the updated folder includes at least a subset of the first plurality of applications installed on the electronic device;
obtaining one or more contextual factors associated with the electronic device;
predicting context information in accordance with the one or more contextual factors;
formatting a user interface on the electronic device in accordance with the context information such that the user interface includes a representation of one or more folders of the plurality of folders;
obtaining an indication of user input associated with a first folder of the one or more folders;
determining an application category associated with the first folder;
responsive to determining the application category associated with the first folder, providing suggestions for installation of one or more additional applications based, at least in part, on the context information and the application category associated with the first folder such that representations of the one or more additional applications are displayed within the first folder;
obtaining a second indication of second user input associated with a second folder of the one or more folders;
determining a second application category associated with the second folder, wherein the second application category is different than the application category; and
responsive to determining the second application category associated with the second folder, providing suggestions for installation of one or more second additional applications based, at least in part, on the context information and the second application category associated with the second folder such that representations of the one or more second additional applications are displayed within the second folder;
wherein the user interface includes a homescreen.

21. The computing system of claim 20, the one or more programs including instructions for:
selecting, in accordance with the context information, a first set of applications from a plurality of applications;
wherein providing suggestions for the one or more additional applications includes formatting, for display, representations of the first set of applications as part of the user interface such that the first set of applications is presented within the first folder.

22. The computing system of claim 20, wherein the one or more contextual factors comprise at least one of:
an environment factor, a speed factor, a weather factor, an altitude factor, a location factor, a device factor, a time factor, a calendar event, or a user profile.

23. The computing system of claim 22, wherein the device factor comprises at least one of:
a network connection status of the electronic device;
a signal reception status of the electronic device;
a plurality of messages sent from or delivered to the electronic device;
a history of applications executed on the electronic device;
a history of user interactions with the user interface of the electronic device;
a history of user interactions with applications displayed on the user interface of the electronic device;
an audio cable connection of the electronic device;
a charging cable connection of the electronic device; or
a history of user notifications displayed on the electronic device.

24. The computing system of claim 20, the one or more programs including instructions for:
determining that a new application has been installed on the electronic device;
after determining that the new application has been installed on the electronic device, determining that the new application is associated with at least one application category associated with a third folder of the plurality of folders; and adding, without user intervention, the new application to the third folder of the plurality of folders.

25. A non-transitory computer readable storage medium storing one or more programs, the one or more programs comprising instructions, which when executed by a computing system with one or more processors, cause the computing system to:

indexing, without user intervention, each application of a first plurality of applications installed on an electronic device according to a plurality of folders;

updating at least one folder of the plurality of folders to generate an updated folder such that the updated folder includes at least a subset of the first plurality of applications installed on the electronic device;

obtaining one or more contextual factors associated with the electronic device;

predicting context information in accordance with the one or more contextual factors;

formatting a user interface on the electronic device in accordance with the context information such that the user interface includes a representation of one or more folders of the plurality of folders;

obtaining an indication of user input associated with a first folder of the one or more folders;

determining an application category associated with the first folder, wherein the application category associated with the first folder corresponds to at least one of game applications, work applications or photography applications; and responsive to determining the application category associated with the first folder, providing suggestions for installation of one or more additional applications based, at least in part, on the context information and the application category associated with the first folder such that representations of the one or more additional applications are displayed within the first folder, wherein the one or more additional applications comprise at least one of a first game application, a first work application or a first photography application;

wherein the user interface includes a homescreen.

26. The non-transitory computer readable storage medium of claim 25, comprising:

selecting, in accordance with the context information, a first set of applications from a second plurality of applications not installed on the electronic device;

wherein providing suggestions for the one or more additional applications includes formatting, for display, the first set of applications as part of the user interface such that the first folder includes representations of the first set of applications.

27. The non-transitory computer readable storage medium of claim 25, wherein the one or more contextual factors comprise at least one of:

an environment factor, a speed factor, a weather factor, an altitude factor, a location factor, a device factor, a time factor, a calendar event, or a user profile.

28. The non-transitory computer readable storage medium of claim 27, wherein the device factor comprises at least one of:

a network connection status of the electronic device;

a signal reception status of the electronic device;

a plurality of messages sent from or delivered to the electronic device;

a history of applications executed on the electronic device;

a history of user interactions with the user interface of the electronic device;

a history of user interactions with applications displayed on the user interface of the electronic device;

an audio cable connection of the electronic device;

a charging cable connection of the electronic device; or a history of user notifications displayed on the electronic device.

29. The non-transitory computer readable storage medium of claim 27, wherein the weather factor comprises at least one of:

a temperature associated with the electronic device;

a rain factor associated with the electronic device;

a snow factor associated with the electronic device; or a wind factor associated with the electronic device.

* * * * *